(12) United States Patent
Shiozaki et al.

(10) Patent No.: US 12,154,217 B2
(45) Date of Patent: Nov. 26, 2024

(54) ELECTRONIC APPARATUS AND CONTROL METHOD OF THE SAME

(71) Applicant: CANON KABUSHIKI KAISHA, Tokyo (JP)

(72) Inventors: Tomoyuki Shiozaki, Kanagawa (JP); Hiroshi Toriumi, Kanagawa (JP); Atsushi Ichihara, Kanagawa (JP); Hiroki Kitanosako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 17/838,352

(22) Filed: Jun. 13, 2022

(65) Prior Publication Data

US 2023/0401782 A1 Dec. 14, 2023

(51) Int. Cl.
| | |
|---|---|
| *G06T 15/10* | (2011.01) |
| *A63F 13/537* | (2014.01) |
| *G06F 3/01* | (2006.01) |
| *G06V 10/764* | (2022.01) |

(52) U.S. Cl.
CPC ............ *G06T 15/10* (2013.01); *A63F 13/537* (2014.09); *G06F 3/013* (2013.01); *G06V 10/764* (2022.01); *A63F 2300/65* (2013.01)

(58) Field of Classification Search
CPC .... G06T 15/10; A63F 13/537; A63F 2300/65; G06F 3/013; G06F 3/011; G06F 3/012; G06V 10/764; G06V 10/44; G06V 40/18; G06V 20/20; G02B 27/0172
See application file for complete search history.

(56) References Cited

U.S. PATENT DOCUMENTS

| | | | |
|---|---|---|---|
| 10,719,993 B1* | 7/2020 | Ha | G06V 10/25 |
| 11,094,107 B2* | 8/2021 | Kunigita | G06F 3/012 |
| 11,481,179 B2* | 10/2022 | Noda | A61B 1/0004 |
| 11,790,553 B2* | 10/2023 | Yuan | G06T 7/246 |
| | | | 382/103 |
| 2019/0079597 A1* | 3/2019 | Kada | G06F 3/013 |
| 2021/0319231 A1* | 10/2021 | Yuan | G06N 3/04 |

FOREIGN PATENT DOCUMENTS

| | | |
|---|---|---|
| JP | 2015-207168 A | 11/2015 |
| JP | 2018-074200 A | 5/2018 |

OTHER PUBLICATIONS

U.S. Appl. No. 17/678,471, filed Feb. 23, 2022 entitled Electronic Apparatus and Control Method of the Same, Tomoyuki Shiozaki et al.

* cited by examiner

*Primary Examiner* — Vijay Shankar
(74) *Attorney, Agent, or Firm* — Cowan, Liebowitz & Latman, P.C.

(57) ABSTRACT

An electronic apparatus includes a display unit, a determining unit configured to determine a target object that a user is paying attention to, an acquiring unit configured to acquire a plurality of types of information on the target object, a referring unit configured to refer to reference information associated with the target object, and a control unit configured to determine the at least one of the plurality of types of information based on the reference information and the plurality of types of information, the display unit displays the at least one of the plurality of types of information and image data stored in a memory, and the reference information is past information of each of the plurality of types of information.

14 Claims, 23 Drawing Sheets

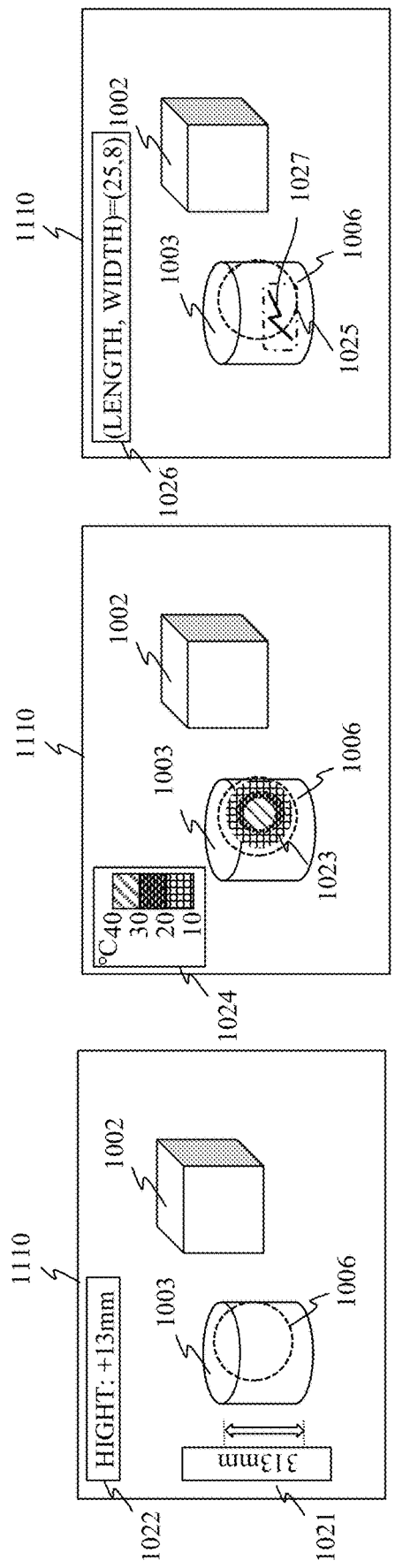

| OBJECT ID | SENSING TIME YY/MM/DD HH:MM:SS | SENSING COORDINATE (x,y,z) | DIMENSION (x,y,z) | SCRATCH Y OR N (LENGTH, WIDTH) | DIRT Y OR N (LENGTH, WIDTH) | TEMPER-ATURE °C |
|---|---|---|---|---|---|---|
| 1003 | 20/11/14 8:00:00 | (151, 353, 504) | (-1,0,0) | N | N | 26 |
| 1003 | 20/11/14 8:10:51 | (185, 413, 558) | (-5,3,5) | N | N | 32 |
| 1003 | 20/11/14 8:40:25 | (369, 366, 518) | (-15,2,1) | Y (14,1) | Y (25,8) | 45 |
| 1003 | 20/11/14 8:50:28 | (484, 359, 591) | (0,1,-1) | N | N | 38 |
| 1003 | 20/11/14 9:15:01 | (683, 214, 323) | (0,0,-1) | N | N | 26 |
| 1003 | 20/11/14 9:28:56 | (659, 165, 221) | (-3,0,-1) | N | N | 25 |
| 1003 | 20/11/14 10:13:11 | (646, 113, 184) | (3,2,0) | N | N | 26 |

FIG. 8

ELECTRONIC APPARATUS AND CONTROL METHOD OF THE SAME

BACKGROUND OF THE INVENTION

Field of the Invention

The present invention relates to an electronic apparatus and a control method of the same.

Description of the Related Art

A work support system using a wearable terminal such as a head mount display ("HMD") presents information on a work target to a display screen, and thus a user can acquire necessary information without taking his/her hand off the work target. For example, Japanese Patent Laid-Open No. ("JP") 2018-74200 discloses a drawing projection system and method for superimposing and displaying three-dimensional drawing data of a construction site on a see-through type display screen of the wearable terminal. For example, in the inspection step, the user can work while comparing the drawing data and the actual work target with each other, and find a defect of the work target etc. at an early stage, improving the accuracy and efficiency of the inspection work.

As an applied work support system, for example, a wearable terminal includes a plurality of different sensing devices, such as a position detecting device and a nonvisible light wavelength detecting device in addition to a camera, and presents various work support information based on the sensing results. This wearable terminal can present to the display screen visually unnoticeable, useful sensing information on the work target, and is expected to further improve the work efficiency.

However, it is annoying to always display various information on the work target on the display screen. Accordingly, for example, JP 2015-207168 discloses a method of recognizing an object from a captured image and of presenting information corresponding to the recognized object.

The method disclosed in JP 2015-207168 fixes information (detection information) to be displayed for each recognized target (target object). The information required by the user differs according to the state of the work target (target object). For example, it is demanded to display dimension information in a case where the dimension of the work target is a feature, and to display temperature information in a case where the temperature of the work target is a feature. However, JP 2015-207168 is silent about a method of selecting and displaying necessary information from among a plurality of types of detection information.

SUMMARY OF THE INVENTION

The present invention provides an electronic apparatus and a control method of the same, each of which can present proper detection information according to a state of a target object.

An electronic apparatus according to one aspect of the present invention includes a display unit, at least one processor, and at least one memory coupled to the at least one processor storing instructions that, when executed by the at least one processor, cause the at least one processor to function as a determining unit configured to determine a target object that a user is paying attention to, an acquiring unit configured to acquire a plurality of types of information on the target object, a referring unit configured to refer to reference information associated with the target object, and a control unit configured to determine the at least one of the plurality of types of information based on the reference information and the plurality of types of information the display unit displays the at least one of the plurality of types of information and image data stored in a memory, and the reference information is past information of each of the plurality of types of information.

Further features of the present invention will become apparent from the following description of exemplary embodiments with reference to the attached drawings.

BRIEF DESCRIPTION OF THE DRAWINGS

FIGS. 6A to 6D explain a system that provides sensing information by a wearable terminal according to a first embodiment.

FIG. 8 is a table for storing sensing information by the wearable terminal according to the first embodiment.

DESCRIPTION OF THE EMBODIMENTS

Referring now to the accompanying drawings, a detailed description will be given of embodiments according to the present invention.

Figure 1:
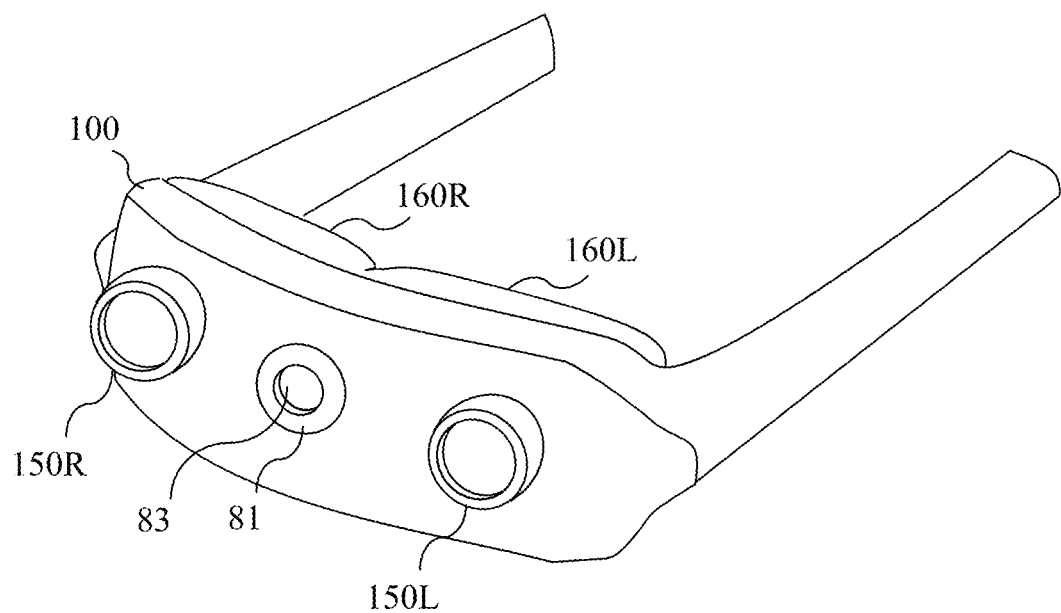
FIG. 1 is an external view of a wearable terminal according to each embodiment.

Referring now to FIG. 1, a description will be given of a wearable terminal (electronic apparatus) 100 according to each embodiment. FIG. 1 is an external view of the wearable terminal 100. In FIG. 1, a right-eye imaging unit 150R and a left-eye imaging unit 150L are imaging unit sections including a lens (lens unit) 103 and an imaging unit 22, which will be described below, respectively. Right-eye and left-eye captured images can be displayed on a right-eye display unit 160R and a left-eye display unit 160L, which will be described below, respectively. Each of the imaging unit 150R and the imaging unit 150L includes a zoom mechanism, which can change a zoom magnification using an operating unit such as a voice UI (user interface) described below. The zoom operation can combine an optical zoom by a lens zoom mechanism and an electronic zoom by cutting out a captured image.

An infrared LED illumination unit 81 and a TOF (Time of Flat) detecting unit 83 (collectively referred to as a second distance measurement unit) are a light emitting illumination unit and a detecting unit, respectively, of a distance measurement system using the TOF type. However, the type of this embodiment is not limited to this example, and other methods such as a triangulation type may be used. The infrared LED illumination unit 81 is disposed in a ring shape about the TOF detecting unit 83, and can irradiate an area much wider than an angle of view of the TOF detecting unit 83. The TOF type distance measurement principle will be described below.

Each of the right-eye display unit 160R and the left-eye display unit 160L is a display unit section including an eyepiece unit 16, a display unit (presenting unit) 29, and a visual-line detecting unit 41, which will be described below. The eyepiece unit 16 is an eyepiece unit for an eyepiece finder (a peep type finder), and the user can visually recognize an image (video) displayed on the internal display unit 29 via the eyepiece unit 16.

Figure 2:
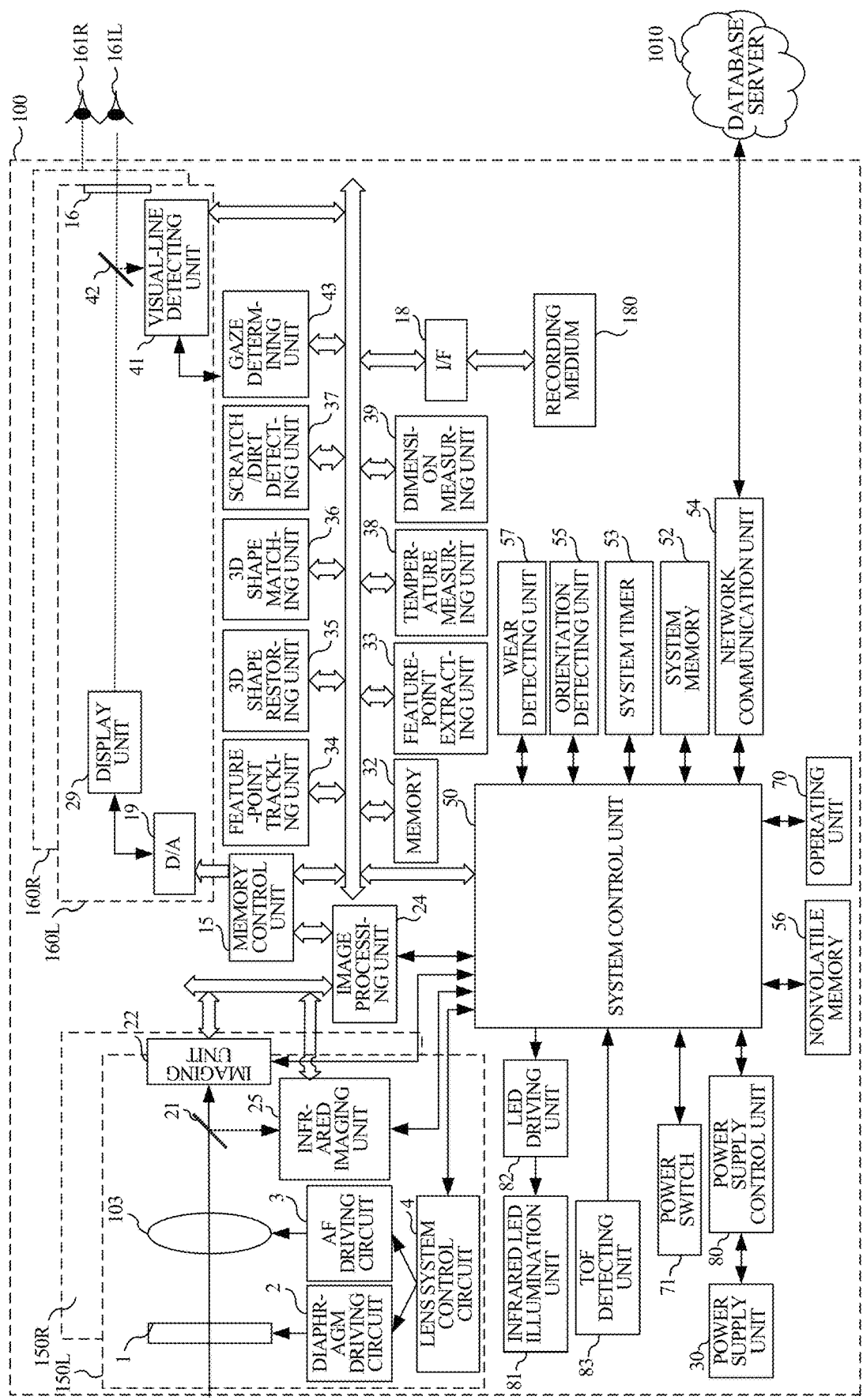
FIG. 2 is a block diagram of the wearable terminal according to each embodiment.

Referring now to FIG. 2, a description will be given of an internal configuration of the wearable terminal 100. FIG. 2 is a block diagram of the wearable terminal 100. Although the lens 103 includes a plurality of lenses, it is simply illustrated as a single lens in FIG. 2. A system control unit 50 realizes diaphragm control by communicating with a lens system control circuit 4 and controlling a diaphragm (aperture stop) 1 via a diaphragm driving circuit 2. A focus lens in the lens 103 is displaced via an AF driving circuit 3 to focus on the object.

A dichroic mirror 21 is disposed for a wavelength separation, and has a structure that transmits the visible light while reflecting the infrared light. The visible light component that has transmitted through the dichroic mirror 21 is photoelectrically converted by the imaging unit 22 for the visible light disposed subsequent to the dichroic mirror 21, and a visible light image signal is generated. The infrared light component reflected by the dichroic mirror 21 is photoelectrically converted by an infrared imaging unit 25 to generate an infrared light image signal.

The imaging unit 22 has an image sensor that includes a CCD, a CMOS element, or the like, and converts an optical image into an electric signal. The imaging unit 22 includes, for example, a single-plate color image sensor for imaging visible light provided with a general primary color filter. The primary color filter includes three types of color filters having main transmission wavelength bands near 650 nm, 550 nm, and 450 nm, respectively, and captures images corresponding to the R (red), G (green), and B (blue) bands, respectively. The imaging unit 22 includes a built-in A/D converter and is used to convert an analog signal output from the image sensor into a digital signal. The imaging unit 22 has a pixel configuration capable of a distance measurement (focus detection) by an imaging-plane phase-difference distance measurement type (imaging-plane phase-difference detecting type) described below.

Similar to the imaging unit 22, the infrared imaging unit 25 has an image sensor that includes a CCD, a CMOS element, or the like and converts an optical image into an electric signal, and may use an image sensor made of Si, InGaAs, InAsSb, or the like, depending on the wavelength band. Thereby, near-infrared light (780 to 2500 nm), mid-infrared light (2500 to 25000 nm), and far-infrared light (4 μm to 1000 μm) are detectable. The near-infrared light is characterized in that its wavelength is not easily absorbed by objects and has high transmitting performance. Utilizing this characteristic, images captured with the near-infrared light are suitable to determine scratches and foreign matters (dirt) on the object. The mid-infrared light or far-infrared light can be used as a thermography to measure the temperature of an object.

An image processing unit 24 performs resizing processing, such as predetermined pixel interpolation and reduction, and color conversion processing for data from the imaging unit 22 or the infrared imaging unit 25 or data from a memory control unit 15 described below. The image processing unit 24 performs predetermined calculation processing using captured image data. The system control unit 50 performs exposure control and distance measurement control based on the calculation result obtained by the image processing unit 24. Thereby, a TTL (through-the-lens) AF (autofocus) processing and AE (auto-exposure) processing are performed. The image processing unit 24 performs predetermined calculation processing using the captured image data, and performs TTL type AWB (auto white balance) processing based on the obtained calculation result.

The memory control unit 15 controls data transmissions and receptions among the imaging unit 22, the image processing unit 24, and a memory 32. The output data from the imaging unit 22 is written down to the memory 32 via the image processing unit 24 and the memory control unit 15 or directly via the memory control unit 15. The memory 32 stores the image data obtained by the imaging unit 22 and the image data to be displayed on the display unit 29. The memory 32 also serves as a memory (video memory) for displaying an image. The image data to be displayed written down on the memory 32 is displayed by the display unit 29 via the memory control unit 15. The display unit 29 displays on a display device such as an LCD or an organic EL according to a signal from the memory control unit 15. Sequentially transferring the image data stored in the memory 32 to the display unit 29 and displaying the image data there can provide live-view display of the captured image.

A visual-line detecting unit 41 detects the user's visual-line positions in the viewfinder screen using an unillustrated infrared light emitting diode. The irradiated infrared light is reflected by the user's eyeballs (eyes) 161R and 161L, respectively, and the infrared reflected light reaches the dichroic mirror 42. The dichroic mirror 42 reflects infrared light and transmits visible light. The infrared reflected light whose optical path has been changed is imaged on the imaging plane of the visual-line detecting unit 41 through an unillustrated imaging lens. The visual-line detecting unit 41 includes an image sensor such as a CCD image sensor.

A gaze determining unit 43 determines whether or not the user is gazing at (paying attention to) a specific imaging target (object). In a case where the detection result is received from the visual-line detecting unit 41 and the time when the user's visual-line is fixed to a point on an arbitrary object exceeds a predetermined threshold, it is determined that the user is gazing at that point. An object corresponding to a gaze point determined by the gaze determining unit 43 will be referred to as a gazed object (target object).

A nonvolatile memory 56 is an electrically erasable and recordable memory, and uses, for example, a Flash-ROM or the like. The nonvolatile memory 56 stores a constant, a program, and the like for the operation of the system control unit 50. The program, as used herein, means a program for executing various flowcharts described below according to each embodiment.

The system control unit 50 is a control unit including at least one processor or circuit, and controls the entire wearable terminal 100. Executing the program recorded in the nonvolatile memory 56 enables each processing of each embodiment to be implemented as described below. For example, a system memory 52 uses a RAM that loads a constant and a variable for the operation of the system control unit 50, a program that is read out of the nonvolatile memory 56, and the like. The system control unit 50 also provides display control by controlling the memory 32, the display unit 29, and the like. A system timer 53 is a time measuring (or timekeeping) unit configured to measure time for various controls and time of a built-in clock.

Figure 3:
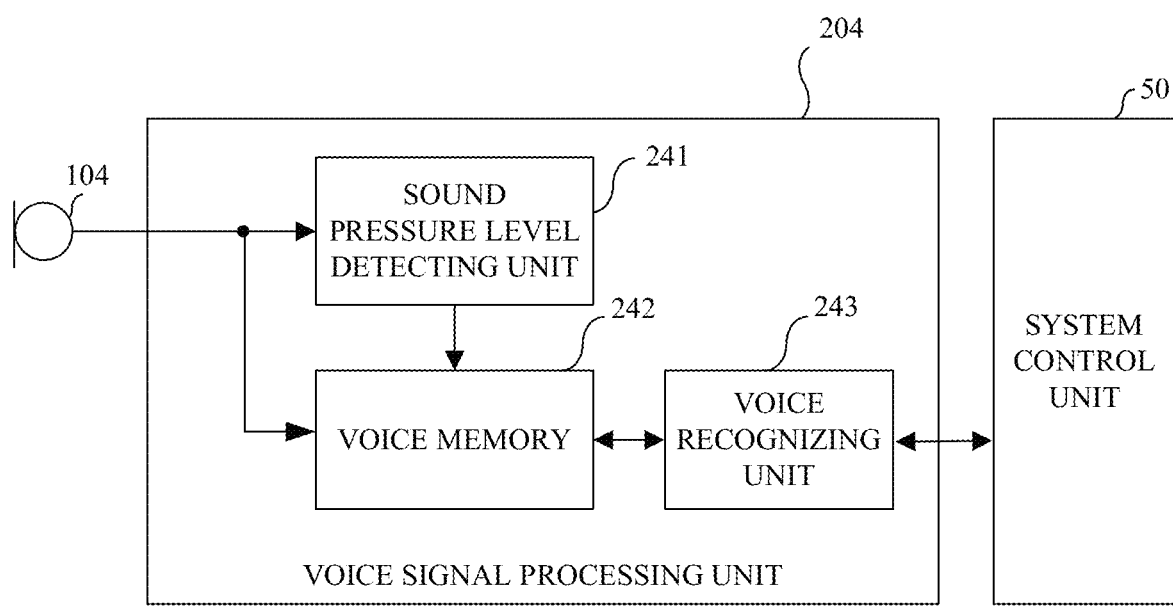
FIG. 3 is a block diagram of an audio signal processing unit according to each embodiment.

An operating unit 70 includes various operating members as an input unit that accepts an operation from the user. The operating unit 70 includes, for example, a voice UI operating unit and a touchpad. FIG. 3 is a block diagram of a voice UI operating unit (voice signal processing unit 204). A voice input unit 104 includes a microphone, and receives the voice of the user wearing the wearable terminal 100 as a sound-wave and converts it into a voice signal. The voice signal processing unit 204 includes a sound pressure level detecting unit 241, a voice memory 242, and a voice recognizing unit 243. The sound pressure level detecting unit 241 detects that an output level of the voice input unit 104 is equal to or higher than a certain threshold. The voice memory 242 stores voice data for commands in advance. The voice memory 242 is also used to sequentially store the output data of the voice input unit 104, triggered by the sound pressure level detecting unit 241. The voice recognizing unit 243 matches the specific voice command stored in the voice memory 242 with the sequentially stored voice data, and determines whether or not the voice command and the voice data coincide with each other. For example, the zoom magnification of the imaging units 150R and 150L can be changed by using the voice command.

The touchpad is mounted on an unillustrated side surface of the wearable terminal 100. The system control unit 50 can detect an operation on or a state of the touchpad. A position coordinate that a finger touches on the touchpad is sent to the system control unit 50 through an internal bus, and the system control unit 50 determines what kind of operation (touch operation) on the touchpad based on the sent information. The touchpad can use any of various touch panels such as a resistance film type, a capacitance type, a surface acoustic wave type, an infrared type, an electromagnetic induction type, an image recognition type, and an optical sensor type.

A power switch 71 is an operating member that switches powering-on and off of the wearable terminal 100. A power supply control unit 80 includes a battery detecting circuit, a DC-DC converter, a switching circuit for switching a block to be electrified, and the like, and detects whether or not a battery is installed, a battery type, and a remaining amount of the battery. The power supply control unit 80 controls the DC-DC converter based on the detection result and the instruction of the system control unit 50, and supplies a necessary voltage to each component including the recording medium 180 for a necessary period. A power supply unit 30 includes a primary battery such as an alkaline battery and a lithium battery, a secondary battery such as a NiCd battery, a NiMH battery, and a lithium-ion battery, an AC adapter, and the like. A recording medium I/F18 is an interface with a recording medium 180 such as a memory card or a hard disk drive. The recording medium 180 is a recording medium such as a memory card for recording a captured image, and includes a semiconductor memory, a magnetic disk, or the like.

A communication unit (referring unit) 54 is connected wirelessly or by a wire cable to transmit and receive video and audio signals. It can also transmit and receive data to and from an external database server 1010. For example, the database server 1010 may store three-dimensional CAD data of a work target so as to construct a drawing projection system that superimposes and displays the three-dimensional drawing data relating to the work target on the display unit 29 with the actual image. The communication unit 54 is also connectable with a wireless LAN (Local Area Network) or the Internet. The communication unit 54 can also communicate with an external device using Bluetooth (registered trademark) or Bluetooth Low Energy.

An orientation (or attitude) detecting unit 55 detects an orientation of the wearable terminal 100 relative to the gravity direction. The orientation detecting unit 55 can use an acceleration sensor, a gyro sensor, or the like. The orientation detecting unit 55 can detect a motion of the wearable terminal 100 (whether or not the wearable terminal 100 is panned, tilted, rolled, stands still, etc.).

A wear detecting unit 57 is a wear detecting sensor that detects whether or not the wearable terminal 100 is worn by the user. The system control unit 50 can switch starting (powering-on) and stopping (powering-off) of the wearable terminal 100 according to the state detected by the wear detecting unit 57. The wear detecting unit 57 can use, for example, an infrared proximity sensor, and may be configured to detect an approach of some object to the eyepiece unit 16. In a case where an object approaches, the infrared light projected from a light emitter (not shown) of the wear detecting unit 57 is reflected and received by the light receiving unit (not shown) of the infrared proximity sensor. A received infrared light amount can also be used to determine how close the object is to the eyepiece unit 16. The infrared proximity sensor is an example, and another sensor such as a capacitance type may be adopted.

An infrared LED illumination unit 81 is an irradiation unit for the TOF system, and the light is modulated to a certain frequency by an LED driving unit 82 and irradiated. The irradiated light from the infrared LED illumination unit 81 illuminates the measurement target. The reflected light from the measurement target is imaged by an imaging lens (not illustrated) and reaches the TOF detecting unit 83 with a time lag t corresponding to the measurement target distance. For example, in a case where the time lag t is 10 nanoseconds, the object distance can be calculated as 3 m (=10 nanoseconds (0.00000001) seconds×300,000 km) because the light speed c is 300,000 km/sec. A distance measurement resolution d in the TOF detection method is expressed by the following expression (1).

$$d_{TOF} = c/(2 \cdot f_{min} \cdot \sqrt{N}) \tag{1}$$

where $f_{min}$ is a modulation frequency, and N is the number of effective signal electrons usable after noise is removed. That is, the distance measurement resolution depends on the SNR representing the signal-to-noise ratio. If measurement targets have the same reflectance, the farther the measurement target is, the smaller the SNR becomes. As a result, within a distance measurable range by the TOF detecting unit 83, the farther the distance measurement target is, the lower the distance measurement resolution is. The distance measurable range depends on the output of the infrared LED illumination unit 81, and a high output needs a large LED and high power consumption. Each embodiment assumes the configuration suitable for the wearable terminal, and the specification that can provide a distance measurement up to a target several meters away.

A feature-point extracting unit 33 extracts a predetermined number of feature points from the image data calculated by the image processing unit 24. The memory 32 stores information on the feature points extracted for each imaging frame by the feature-point extracting unit 33. The feature-point extracting method can use various methods such as Scale-Invariant Feature Transfer (SIFT) and Features from Acknowledged Segment Test (FAST). Alternatively, Oriented FAST and Rotated BRIEF (ORB) may be used. The detected feature points are stored as a feature amount descriptor for calculating a binary vector capable of memory-saving and high-speed matching such as Binary Robust Independent Elementary Features (BRIEF).

A feature-point tracking unit 34 reads out the feature point information stored in the memory 32 and compares it with the feature points extracted in the image data in a new imaging frame. Thereby, feature points are matched between a plurality of images. The matching method can use, for example, a brute-force matcher, a FLAN based matcher, and a Mean-Shift searching method.

A three-dimensional shape restoring unit 35 restores a three-dimensional shape of an imaging scene from a plurality of acquired captured image data. The three-dimensional shape restoring unit 35 can use, for example, a method such as SfM (Structure from Motion) or SLAM (Simultaneous Localization and Mapping). In either method, the three-dimensional shape restoring unit 35 matches the extracted feature points by the feature-point tracking unit 34 with a plurality of captured images having different orientations and positions, and finds corresponding points between the images. For example, by using an optimization method, such as Bundle Adjustment, a three-dimensional position (three-dimensional points data), a camera position, and a camera orientation of the matched feature points are estimated. The three-dimensional shape restoring unit 35 may improve the estimation accuracy of the three-dimensional points data and the camera position and orientation by using a method such as Visual Initial SLAM that adds the output of the orientation detecting unit 55 to the optimization condition. The system control unit 50 may further add the distance measurement result by the TOF detecting unit 83 to improve the estimation accuracy by the SLAM.

A three-dimensional shape matching unit (calculating unit) 36 aligns the shape of the three-dimensional points data generated by the three-dimensional shape restoring unit 35 and the shape of the target object on the three-dimensional CAD data stored in the external database server 1010 or the like with each other, and matches (compares) the arrangement. The alignment can use a method such as an ICP (Iterative Close Point) algorithm. Data is transmitted to and received from the external database server 1010 via the communication unit 54. This configuration can verify which coordinate position each feature point extracted by the feature-point extracting unit 33 corresponds to in the target object coordinate system. The position and orientation of the wearable terminal 100 during imaging each image data can be estimated from the arrangement relationship.

A scratch/dirt detecting unit 37 detects whether or not there is a defect due to any scratches on the measurement target or dirt caused by the adhesion of foreign matters from the infrared image data acquired by the infrared imaging unit 25. The scratch detecting method can use, for example, a difference in infrared emissivity between the defective portion and the surface of the non-defective portion. This emissivity difference appears as a gradation difference on the infrared image data. Image processing such as edge processing and background noise cut is applied to the infrared image data, and if the length and area of the detected defect are equal to or larger than the reference determination threshold, it is determined as a defect. For example, a method of detecting scratches or foreign matter from the image data acquired by the imaging unit 22 may be used.

A temperature measuring unit (temperature detecting unit) 38 measures a two-dimensional temperature distribution of the measurement target from the infrared image data acquired by the infrared imaging unit 25. Given an ideal infrared radiator, a relationship between the radiation and the temperature follows the Stefan-Boltzmann's law. The infrared radiance emitted from the measurement target is compared with the blackbody radiance, which is an ideal infrared radiator, and can be converted into the temperature.

A dimension measuring unit (dimension detecting unit) 39 measures a dimension (size) of the measurement target based on the distance measurement information acquired, for example, by the TOF detecting unit 83. A map of an object on a captured image can be restored to a real-scale three-dimensional shape using a camera parameter that represents a known geometric relationship for perspectively projecting and converting a three-dimensional coordinate point into a captured image space. This configuration can measure a dimension of a designated part of the object. The dimension measurement may utilize a restoring method using the three-dimensional shape restoring unit 35. The distance measurement unit may use an imaging-plane phase-difference focus-detecting type of the imaging unit 22.

Figure 4A:
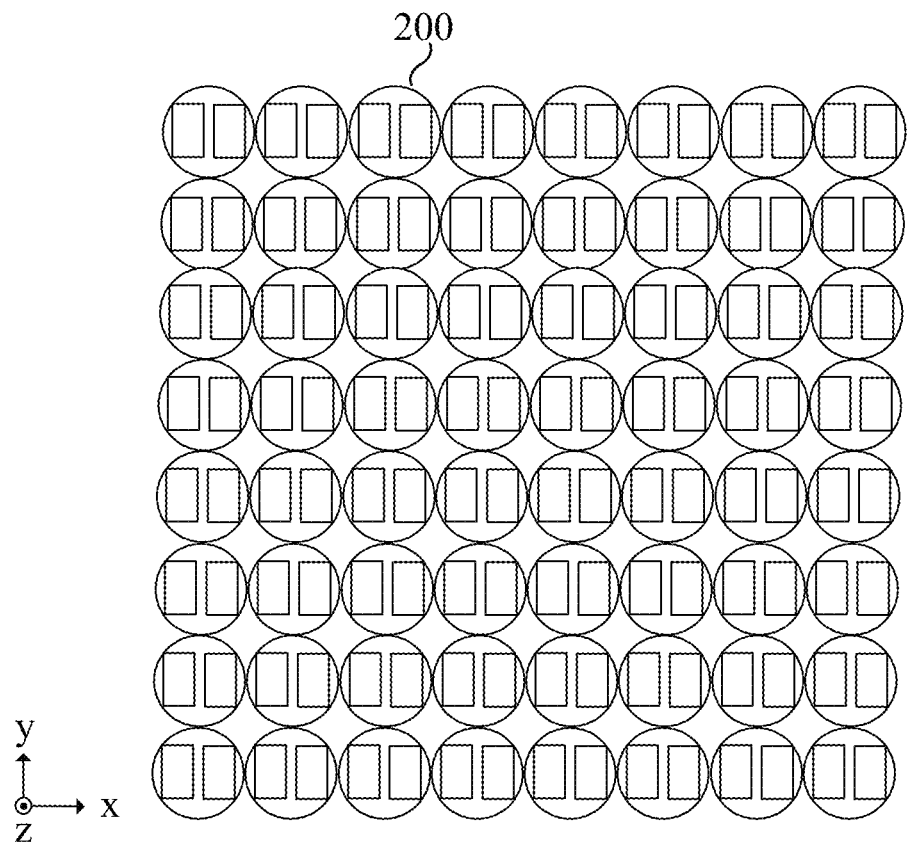
FIGS. 4A and 4B are configuration diagrams of an image sensor according to each embodiment.
Figure 4B:
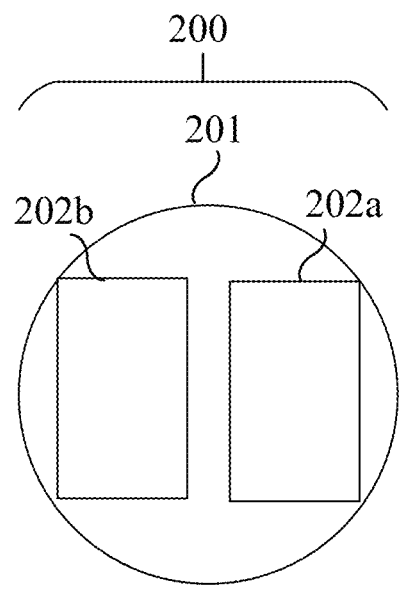

Referring now to FIGS. 4A and 4B, a description will be given of a configuration of the image sensor in the imaging unit 22. FIGS. 4A and 4B are configuration diagrams of the image sensor. As illustrated in FIG. 4A, in the image sensor, a plurality of pixels 200 are two-dimensionally and regularly arranged. More specifically, the plurality of pixels 200 is arranged, for example, in a two-dimensional lattice pattern. The arrangement of the pixels 200 is not limited to the lattice pattern, and another arrangement may be adopted.

In order to realize a focus detecting function of the imaging-plane phase-difference focus-detecting type, each pixel 200 includes a microlens 201 illustrated in FIG. 4B and pupil dividing pixels 202a and 202b which are a pair of photoelectric converters. The pupil dividing pixels 202a and 202b are photoelectric converters having the same shape and the same size, in which the imaging plane has a rectangular shape with a y-axis direction as the longitudinal direction. In each pixel 200, the pupil dividing pixels 202a and 202b are arranged line-symmetrically with a perpendicular bisector along the y-axis direction of the microlens 201 as an axis of symmetry. The shapes of the pupil dividing pixels 202a and 202b on the imaging plane are not limited to this example, and may be other shapes. The arrangement of the pupil dividing pixels 202a and 202b is not limited to the arrangement parallel to the x-axis direction, and another arrangement may be adopted.

This configuration enables the imaging unit 22 according to each embodiment to output an A image relating to the image signal output from the pupil dividing pixel 202a included in all pixels in the image sensor, and a B image relating to the image signal output from the pupil dividing pixel 202b in the same manner. The A image and the B image have a parallax relationship according to a distance from the in-focus position.

The system control unit 50 calculates a defocus amount of an image of each object included in the captured image as information on a distance distribution of the object in the depth direction of the imaging range. The defocus amount is calculated, for example, as described below based on images (A image and B image) having an acquired parallax as in each embodiment. The calculation of the defocus amount includes, for example, the processing of dividing the image (A image and B image) into small blocks. The small block may be set for an area of a predetermined size centered on a pixel, for example, in a case where each pixel of the A image as a target is set to a target pixel. In the following description, the small block will be described as being set as a square area of m×m pixels, but the shape and size of the small block are not limited to this example.

Figure 5A:
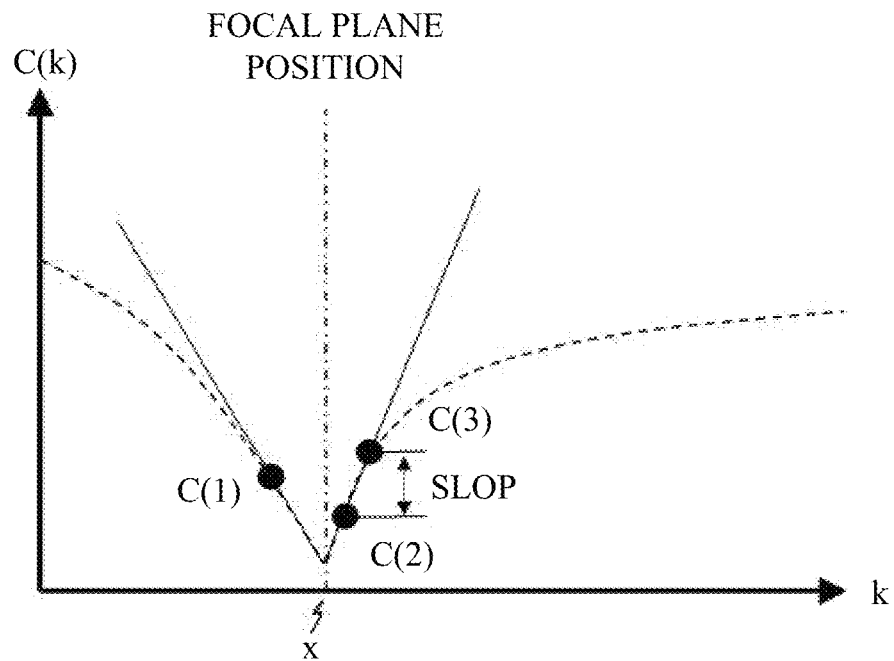
FIGS. 5A and 5B are explanatory diagrams of a distance measurement method according to each embodiment.

For example, when a small block is set for each pixel of the A image and the B image, correlation calculation processing is performed for each pixel (target pixel) between the two images, and a shift amount (image shift amount) of the image included in the small block corresponding to the pixel is calculated. A correlation amount $C(k)$ is calculated by the following expression (2) in the correlation calculation processing.

$$C(k)=\Sigma|E(n)-F(n+k)| \tag{2}$$

where m is the number of data (the number of pixels) of the (pair of) small blocks determined for the target pixel at the same position in the A image and the B image, $E(1)$ to $E(m)$ are pixel data of the pair of small blocks, k (integer) is a (data) shift amount [pixel], a $\Sigma$ operation is performed for n, and n and n+k are limited to a range of 1 to m. The shift amount k is a relative shift amount in the unit of the detection pitch of the pair of image data. Thus, when a correlation amount is calculated for a pair of pupil-division images (a pair of small blocks) relating to one target pixel, the shift amount k and the correlation amount $C(k)$ show a relationship illustrated in a graph of FIG. 5A, for example. At this time, the correlation amount $C(k)$ becomes minimum in the image shift amount having the highest correlation. Thereby, a shift amount x that gives the minimum value $C(x)$ to the continuous correlation amount can be calculated from the following expressions (3) and three-point interpolation method:

$$x=kj+D/SLOP$$

$$C(x)=C(kj)-|D|$$

$$D=\{C(kj-1)-C(kj+1)\}/2$$

$$SLOP=MAX\{C(kj+1)-C(kj),C(kj-1)-C(kj)\} \tag{3}$$

where kj is a shift amount k that minimizes the discrete correlation amount $C(k)$. The shift amount x thus obtained is obtained as the image shift amount in one target pixel. A defocus amount DEF in each target pixel can be calculated from the following expression (4) using the image shift amount x:

$$DEF=KX \cdot PY \cdot x \tag{4}$$

where PY is a pixel pitch of the image sensor (distance between pixels in an image sensor, unit [mm/pixel]), and KX is a conversion coefficient determined by a size of an opening angle of the center of gravity of a light beam passing through the pair of distance measurement pupils. Since the size of the opening angle of the center of gravity of the light beam passing through the pair of distance measurement pupils changes according to the F-number (Fno) of the lens 103, it is determined according to setting information during imaging. The F-number is a value (Fno=f/A) obtained by dividing the focal length f of the lens by the effective aperture diameter A of the diaphragm. Thus, the defocus amount of the object in each pixel of the captured image can be calculated by repetitively calculating while shifting the position of the target pixel by one pixel each.

Figure 5B:
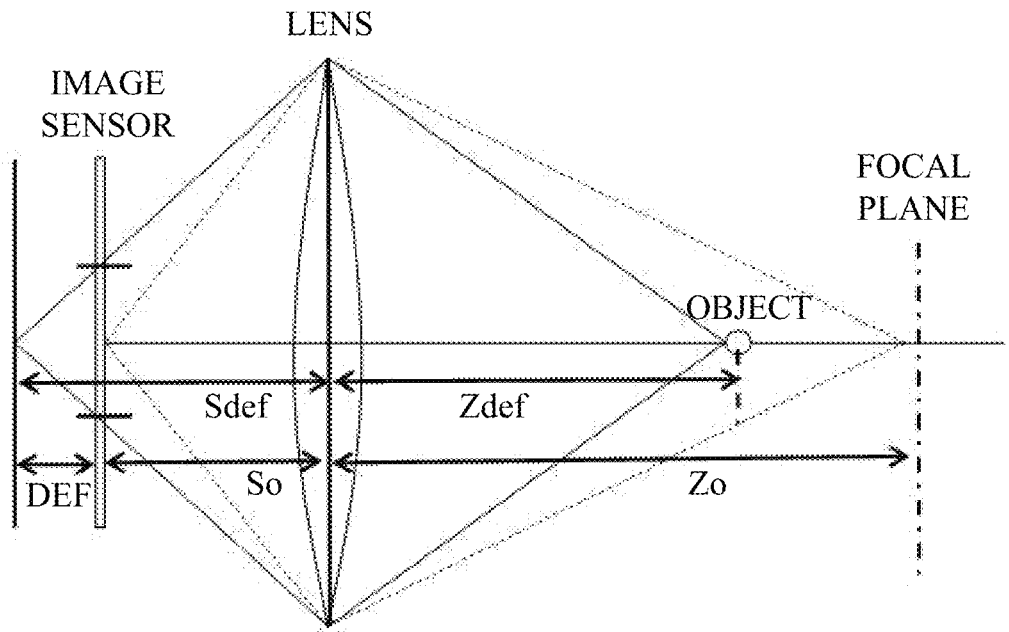

FIG. 5B illustrates an imaging relationship between the object side and the image sensor (image plane side) using the lens 103 as a boundary in a case where the lens 103 is approximated to a thin lens. Based on the thin-lens approximation, the relationship of the following expression (5) is established:

$$1/Zo+1/So=1/f$$

$$1/Zdef+1/(So+DEF)=1/f \tag{5}$$

where Zo is an object-side distance of an in-focus object, Zdef is an object-side distance of a defocus object, So is an image-plane-side distance of the in-focus object, and Sdef is an image-plane-side distance of the defocus object (Sdef=So+DEF). From these expressions, a distance to the object can be obtained from the following expression (6):

$$Zdef=(Sdef \cdot f)/(Sdef-f) \tag{6}$$

Regarding an image shift amount, the relationship of the following expression (7) is established:

$$PY \cdot x=|So-Sdef| \cdot f^2/\{So \cdot Fno \cdot (Sdef-f)\} \tag{7}$$

The image shift amount is a discrete amount based on the pixel pitch PY. That is, the distance measurement resolution is determined by the sensitivity of the image shift amount. As illustrated in the following expression (7), the longer the focal length f is and the smaller the Fno is, the larger the minimum resolution is. Assume that the vicinity of the distance measurement target is focused, the minimum distance measurement resolution $d_{TOF}$ can be approximated by the following expression (8):

$$d_{DEF}=DOF/2$$

$$DOF=2 \cdot Zo^2 \cdot Fno \cdot PY/f^2 \tag{8}$$

where DOF (Depth of Field) is equivalent with a depth of field corresponding to the image shift amount of 1 [pixel].

First Embodiment

Figure 6A:
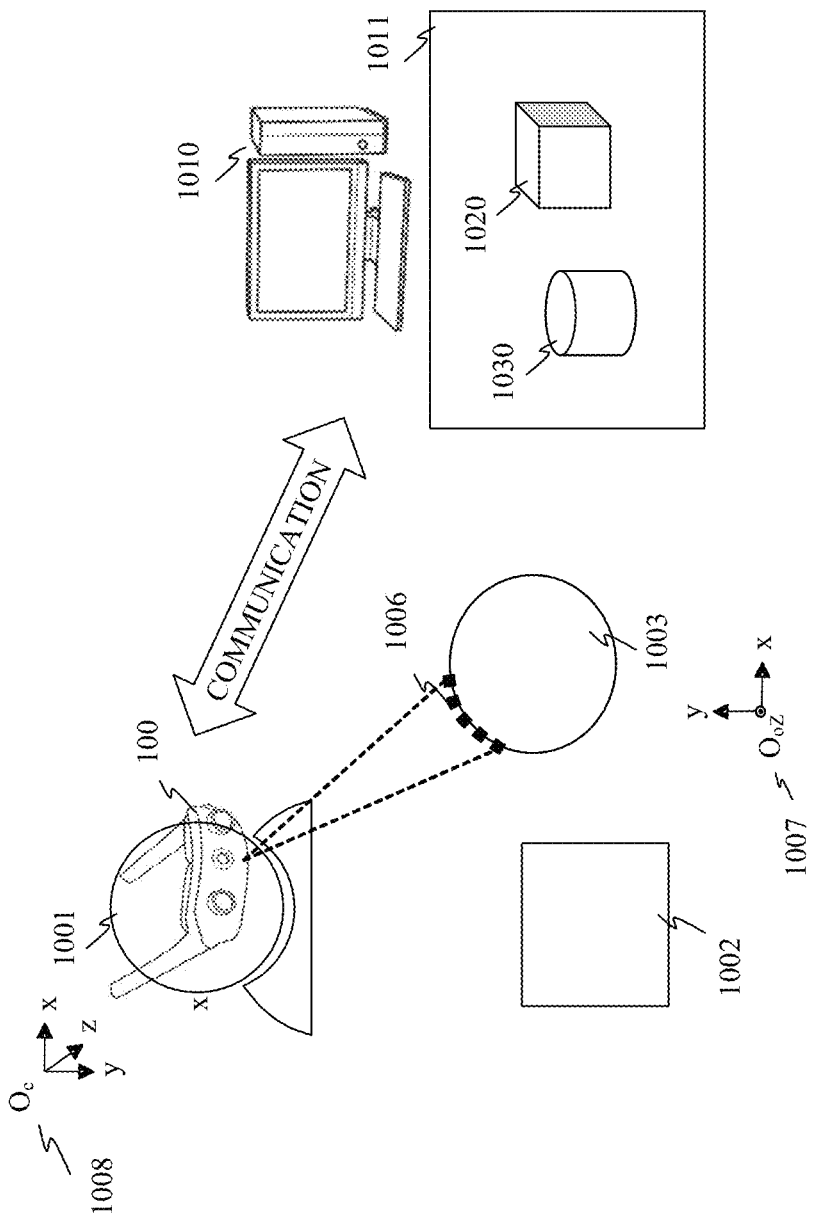

Referring now to FIGS. 6A to 6D and 7A to 7D, a description will be given of a method of providing sensing information by the wearable terminal 100 according to a first embodiment of the present invention. FIGS. 6A to 6D explain a system that displays sensing information by the wearable terminal 100 in this embodiment according to a work target. In FIG. 6A, a worker (user) 1001 wears the wearable terminal 100. The wearable terminal 100 can send and receive information to and from the database server 1010 that stores three-dimensional data of work target objects 1002 and 1003 via the communication unit 54. A data space 1011 represents a data space of the database server 1010, and three-dimensional data (reference information) 1020 and 1030 are, for example, three-dimensional CAD data of the work target objects 1002 and 1003, respectively. The worker 1001 is gazing at an area (gaze area, target area) 1006 indicated by dotted lines on the work target object 1003. An object coordinate system 1007 is a coordinate system fixed to the work target object space. A camera coordinate system 1008 is a coordinate system fixed to the wearable terminal 100.

Figure 7A:
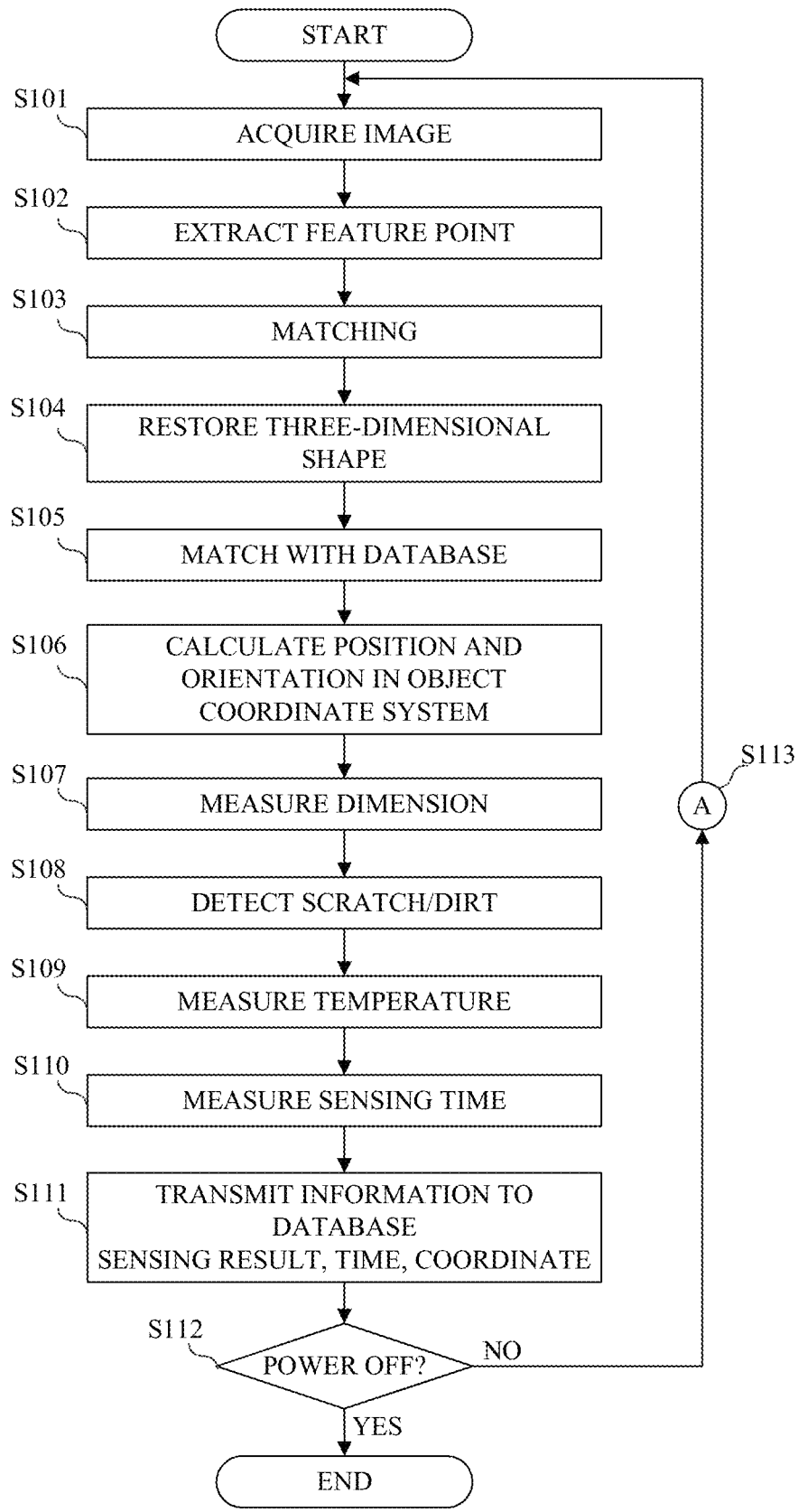
FIGS. 7A and 7B illustrate a flowchart of a method of providing sensing information by the wearable terminal according to the first embodiment.
Figure 7B:
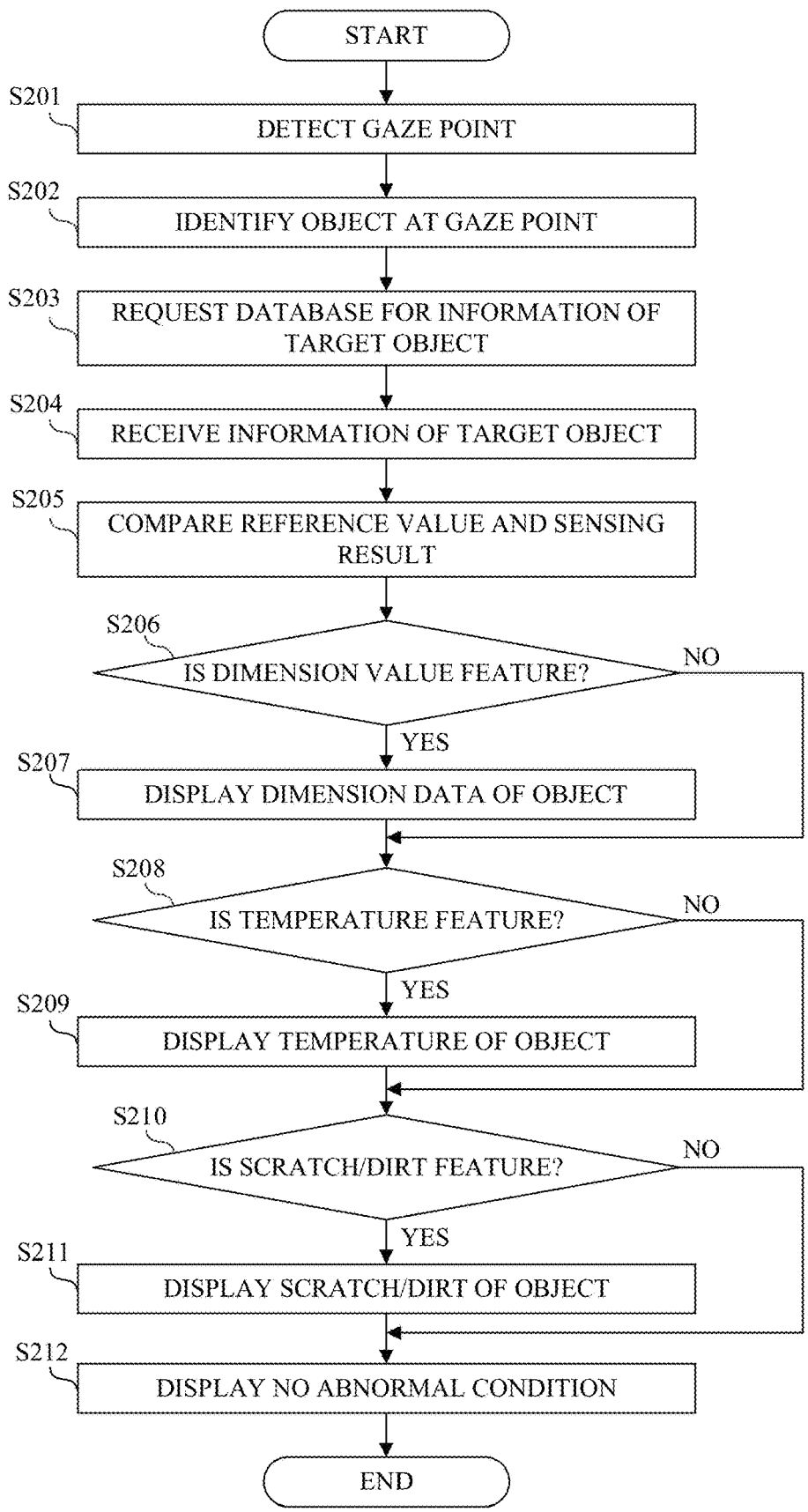

FIGS. 7A and 7B illustrate flowcharts of a method of providing sensing information by the wearable terminal 100 according to this embodiment. Each step in the flowchart in FIGS. 7A and 7B is implemented by the system control unit 50 in the wearable terminal 100 that has loaded the program stored in the nonvolatile memory 56 in the system memory 52 and executed the program to control each functional block. FIG. 7A is a flowchart illustrating a method of associating (tagging) the sensing information by the wearable terminal 100 with each target object and of storing it in the database server 1010. FIG. 7B is a flowchart illustrating a method of comparing the sensing information by the wearable terminal 100 with the reference value stored in the database server 1010 and of switching presented information. A description will now be given of each flowchart.

First, in the step S101, the system control unit 50 stores in the memory 32 the captured image obtained by the imaging unit 22. Next, in the step S102, the system control unit 50 extracts feature points from the captured image data using the feature-point extracting unit 33. Next, in the step S103, the system control unit 50 reads out the feature point information on the past frames stored in the memory 32, and transmits it with the newly extracted feature points to the feature-point tracking unit 34. The feature-point tracking unit 34 compares feature points between frames. Next, in the step S104, the system control unit 50 transmits the matching result to the three-dimensional shape restoring unit 35. The three-dimensional shape restoring unit 35 converts the matched feature points into three-dimensional points data.

Next, in the step S105, the system control unit 50 receives the three-dimensional data 1030 of the work target object from the database server 1010. The system control unit 50 aligns the three-dimensional points data and the three-dimensional data 1030 with each other using the three-dimensional shape matching unit 36, and matches the position and the orientation. Next, in the step S106, the system control unit 50 estimates the position and orientation of the wearable terminal 100 in the object coordinate system 1007 (equivalent with the position and orientation in the camera coordinate system 1008) based on the matching result in the step S105. At this time, grasping the position and orientation of the wearable terminal 100 in the object coordinate system 1007 can identify each of a plurality of objects having the same shape.

Next, in the step S107, the system control unit 50 measures the dimension of the work target object 1003 using the dimension measuring unit 39. Next, in the step S108, the system control unit 50 detects a scratch/dirt on the surface of the work target object 1003 using the scratch/dirt detecting unit (scratch detecting unit, dirt detecting unit) 37 and inside the work target object 1003 which is detectable by a transmission of the infrared light. Next, in the step S109, the system control unit 50 measures a temperature distribution on the work target object 1003 using the temperature measuring unit 38. Next, in the step S110, the system control unit 50 measures the sensing time (time of acquiring the detection information) in the steps S107, S108, and S109 using the system timer 53.

Next, in the step S111, the system control unit 50 transmits and stores the sensing result (detection information) to the database server 1010. The database server 1010 stores the sensing result, such as a table illustrated in FIG. 8. The database server 1010 stores the identification object ID (identification information), the coordinate of the sensed position (detected position) in the object coordinate system 1007, and the sensing result and the sensing time of the steps S107 to S109 by associating (tagging) them with each other. For example, the dimension information may include a difference value (difference information) from the dimensional reference value of the three-dimensional data 1030. For example, the information on the scratch or dirt may be stored with the result of presence or absence, and when the presence is determined, its shape may also be stored. The shape is measured using the dimension measuring unit 39.

Next, in the step S112, the system control unit 50 determines whether or not to stop the operation based on the detection result of the power switch 71 or the detection result of the operating unit 70. If it is determined to be YES, the sensing processing flow is stopped. If it is determined to be NO, the flow returns to the step S101 and the sensing processing flow is repeated. In the step S113, the system control unit 50 implements the flow illustrated in FIG. 7B. This will be described below with reference to FIG. 7B.

First, in the step S201, the system control unit 50 refers to the determination result of the gaze determining unit 43 and detects the gaze point of the worker 1001. In the gaze determination, if a time period when the visual lines of the worker 1001 are fixed onto a specific portion exceeds a predetermined threshold in the object coordinate system 1007, it is determined that the portion is gazed. Next, in the step S202, the system control unit 50 identifies the object at the gaze point. In the example illustrated in FIGS. 6A to 6D, the work target object 1003 corresponds to the target object of the gaze point.

Next, in the step S203, the system control unit 50 requests the database server 1010 for information on the work target object 1003. Next, in the step S204, the system control unit 50 receives the three-dimensional data 1030 and the table information illustrated in FIG. 8 from the database server 1010. Next, in the step S205, the system control unit 50 compares the latest sensing result with the reference value. The reference value means the past information on the three-dimensional data 1030 and the table illustrated in FIG. 8.

Next, in the step S206, the system control unit 50 determines whether or not there is a difference (feature) in the dimensional information by comparing it with the reference value. For example, in a case where the difference between the dimension value of the three-dimensional data 1030 which is the reference value and the latest dimension measurement value is equal to or more than the predetermined standard value, it is determined that there is a difference (feature). In the table illustrated in FIG. 8, it may be determined that there is a difference (feature) in a case where a difference between the latest dimensional measurement value and the past information in the last measurement that is used as the reference value is equal to or more than a predetermined standard value. In the table illustrated in FIG. 8, it may be determined that there is a difference in a case where a difference between the latest dimensional measurement value and the past information in the first measurement that is used as the reference value is equal to or more than a predetermined standard value. If it is determined to be YES, the flow proceeds to the step S207. If it is determined to be NO, the flow proceeds to the step S208.

In the step S207, the system control unit 50 displays the dimension measuring result of the work target object 1003 on the display unit 29. FIG. 6B illustrates a display example. A display 1110 illustrates an image displayed on the display unit 29. A dimension display 1021 is an example in which the height dimension measurement result of the work target object 1003 does not satisfy the standard and the dimension value is displayed as information. A dimension caution display 1022 is an example of a caution display indicating how high the height dimension measurement result is in comparison with the reference value.

In the step S208, the system control unit 50 determines whether there is a difference (feature) in the temperature information by comparing it with the reference value. For example, in a case where the latest temperature measurement result is equal to or higher than the predetermined standard value as a temperature upper limit determined for the three-dimensional data 1030, it is determined that there is a difference (feature). In the table illustrated in FIG. 8, it may be determined that there is a difference in a case where a difference between the latest temperature measurement value and the past information in the last measurement that is used as the reference value is equal to or more than a predetermined standard value. In the table illustrated in FIG. 8, it may be determined that there is a difference in a case where a difference between the latest temperature measurement value and the past information in the first measurement that is used as the reference value is equal to or more than a predetermined standard value. It may be determined that there is a difference when a difference between the latest temperature measurement value and the past temperature information on the coordinate within a certain range measured within a certain time is equal to or more than a predetermined standard value. If it is determined to be YES, the flow proceeds to the step S209. If it is determined to be NO, the flow proceeds to the step S210.

In the step S209, the system control unit 50 displays the temperature measurement result of the work target object 1003 on the display unit 29. FIG. 6C illustrates a display example. A display 1110 illustrates an image displayed on the display unit 29. A temperature display 1023 is an example in which the temperature of the work target object 1003 does not satisfy the standard and information is displayed. As illustrated in FIG. 6C, the temperature display 1023 may use a method of separating by color and displaying the temperature. A color bar display 1024 indicates the temperature (° C.) of each color.

In the step S210, the system control unit 50 determines whether there is a difference (feature) in the scratch/dirt information by comparing it with the reference value. For example, if a shape of the detected scratch/dirt does not satisfy a permissible dimension value of the scratch/dirt determined as the reference value of the three-dimensional data 1030, it is determined that there is a difference (feature). In the table illustrated in FIG. 8, it may be determined that there is a difference if a difference between the shape of scratch/dirt in the latest measurement result and the past information in the last measurement that is used as a reference value is equal to or more than a predetermined standard value. In the table illustrated in FIG. 8, it may be determined that the disappearance of the scratch/dirt is a difference if no scratch/dirt is detected in the latest measurement result using the past information in the last measurement that is used as a reference value. If it is determined to be YES, the flow proceeds to the step S211. If it is determined to be NO, the flow proceeds to the step S212.

In the step S211, the system control unit 50 displays the scratch/dirt detection result of the work target object 1003 on the display unit 29. FIG. 6D illustrates a display example. A display 1110 illustrates an image displayed on the display unit 29. A scratch display 1025 illustrates example information in which the work target object 1003 has scratches beyond the standard. The scratch display 1025 displays an area containing the scratch 1027. A scratch caution display 1026 is a caution display example illustrating the scratch shape. In the step S212, the system control unit 50 determines that there is no measurement result that does not satisfy the standard, and displays no abnormal condition on the display unit 29.

The method of providing sensing information by the wearable terminal 100 has been described. This embodiment can identify a work target object required by a worker and present to the worker information on a sensing result that does not satisfy the reference value provided to the target object. Not displaying information on objects that are not work targets or unnecessary sensing information can reduce the annoying display.

This embodiment compares a dimension value, temperature, scratches or dirt of the work target object with a reference value, determines if there is a difference, and displays information illustrated in the steps S207, S209, and 211 if there is the difference. For example, when the difference occurs in a plurality of sensing results, each information may be combined and displayed at the same time. For example, a priority may be previously set to a plurality of sensing results, and information only on the sensing result having a high priority may be displayed. For example, in each sensing result, the level as the degree of the difference may be configured determined and a sensing result having a high level (large difference) may be preferentially displayed.

The configuration according to this embodiment receives the three-dimensional data 1030 from the database server (storage device) 1010 and stores the sensing result in the database server 1010, but the database server 1010 is not essential. For example, all three-dimensional data and sensing result necessary for the storage device of the wearable terminal 100 may be stored. On the other hand, it is advantageous for the database server 1010 to reduce the storage capacity of the wearable terminal 100. In addition, in a case where a plurality of wearable terminals 100 are used, there is an advantage that sensing information can be shared (detection information detected by a plurality of wearable terminals can be stored in a common storage device).

The processing flows in FIGS. 7A and 7B in this embodiment may be carried out using a plurality of wearable terminals 100. A sensing result of another wearable terminal 100 may be used as a reference value.

This embodiment matches, in the step S105, the three-dimensional data 1030 with the three-dimensional points data, but the three-dimensional data 1030 is not always necessary. The three-dimensional points data acquired in the past may be used as the reference value. The three-dimensional restoring method is not limited to the method of generating the three-dimensional points data. The three-dimensional restoring method may be used while a feature amount is not set to a point but set to a geometric amount such as a line or a circle. A three-dimensional restoring method using all pixels in the captured image data may be used, such as Dens SLAM.

This embodiment uses the method of displaying the dimension, temperature, or scratch/dirt as sensing information, but the method is not limited to this example. Any sensing information may be used as long as the presentation of a plurality of sensing information is switched based on difference information from the reference value (reference information).

This embodiment uses the method of storing information based on the table illustrated in FIG. 8, but the method is not limited to this example. As long as the past sensing information and the latest sensing information are compared with each other, the method is not limited.

In this embodiment, the reference value is received from the database server 1010 via the communication unit 54. However, the wearable terminal 100 itself may store the three-dimensional data and past sensing information in the memory 32 or like, and the wearable terminal 100 may read the reference value from the memory to refer to the reference value.

This embodiment identifies a gazed object using the gaze detecting unit, but the method is not limited to this example. The work target object may be specified by a selection of a certain operating unit.

Second Embodiment

Referring now to FIGS. 9A to 9C and 10A and 10B, a description will be given of a method of providing sensing information by a wearable terminal 100 according to a second embodiment of the present invention. The first embodiment has discussed the configuration using a single wearable terminal 100, but the present embodiment will discuss a method using a plurality of wearable terminals 100 of providing a worker with information on a work area at a blind spot that cannot be seen from one of the wearable terminals 100. In the first embodiment, the presented information on the work target is information on the target that the user is viewing. Therefore, for example, in the inspection work, any objects to be inspected at a blind position for the worker may be overlooked in the first embodiment. This embodiment will describe a configuration capable of providing information on a blind area of a target work target for one user which is obtained by another user, in the case where a plurality of users use the wearable terminals 100.

Figure 9A:
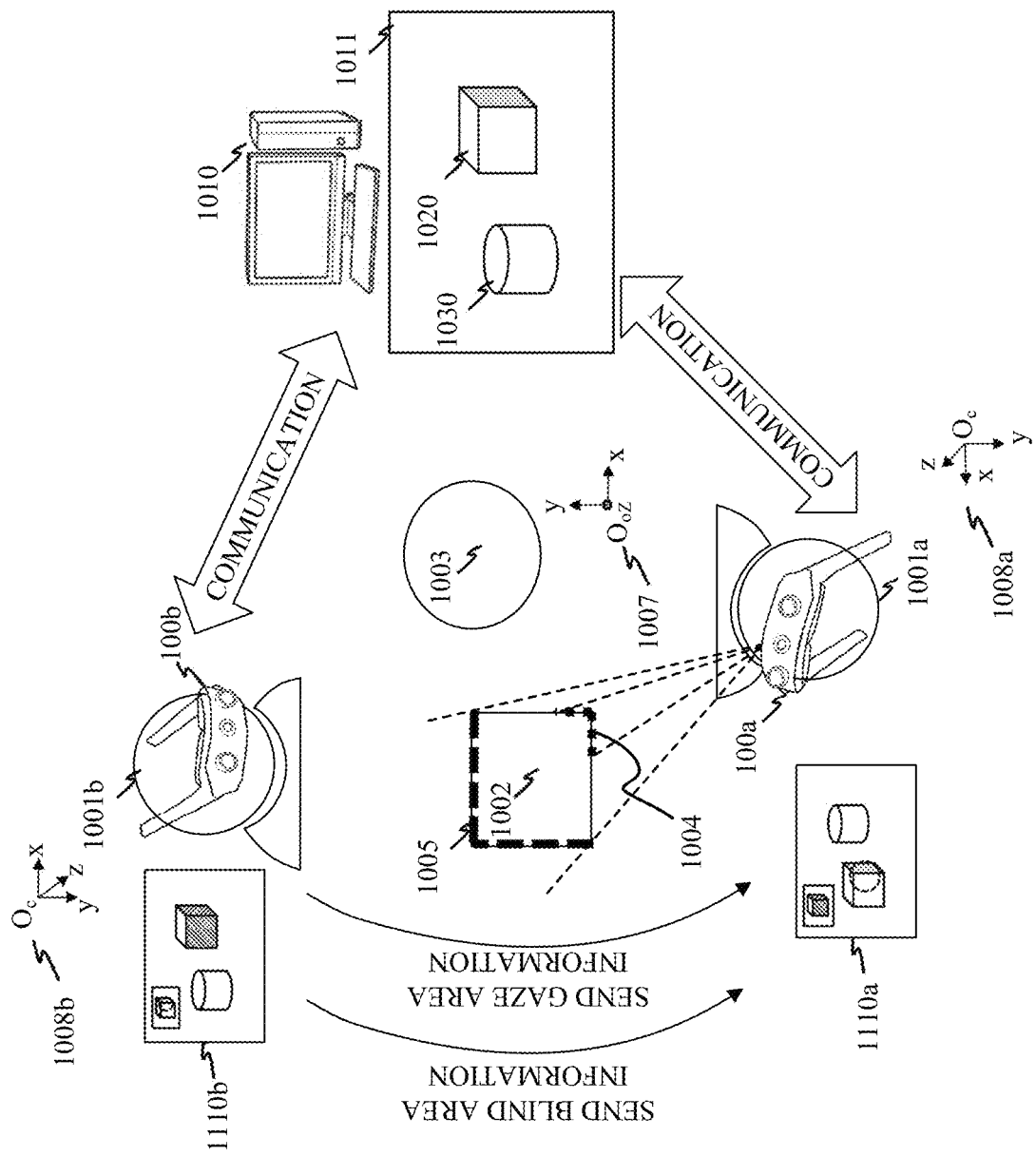
FIGS. 9A to 9C explain a system that supports a user having a blind spot using two wearable terminals according to a second embodiment.
Figure 9C:
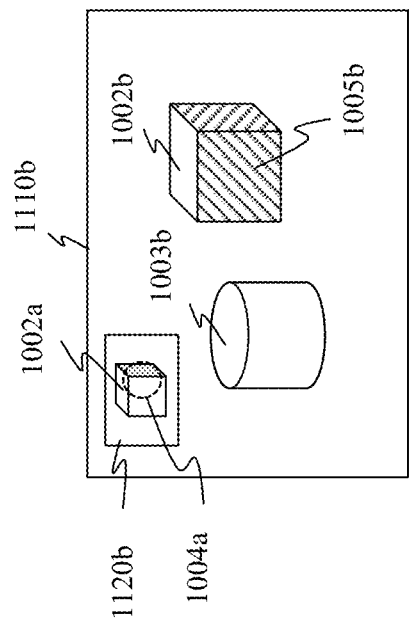
Figure 9B:
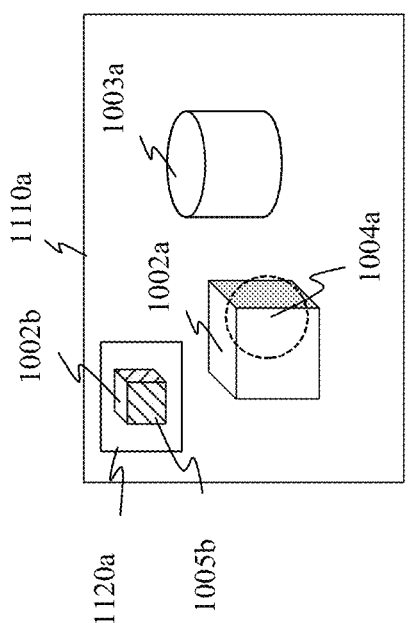

FIGS. 9A to 9C are explanatory diagrams of a system that supports a user having a blind spot using two wearable terminals 100a and 100b according to this embodiment. In FIGS. 9A to 9C, a worker (user) 1001a as a main worker is mounted with a wearable terminal 100a. A worker (user) 1001b as a sub-worker is mounted on a wearable terminal 100b. The wearable terminals 100a and 100b can transmit and receive information including image data to and from each other via the respective communication units 54. The worker 1001a is gazing at an area 1004 indicated by a dotted line on a work target object 1002. A blind area 1005 drawn by a dotted line on the work target object 1002 is an area on the backside of the work target object 1002 when viewed from the worker 1001a, and is a blind spot for the worker 1001a. A display 110a represents a display image displayed on the display unit 29 of the wearable terminal 100a. A display 1110b is a display image (captured image) displayed on the display unit 29 of the wearable terminal 100b. The object coordinate system 1007 is a coordinate system fixed on the work target object space. A camera coordinate system 1008a is a coordinate system fixed to the wearable terminal 100a. A camera coordinate system 1008b is a coordinate system fixed to the wearable terminal 100b.

Figure 10A:
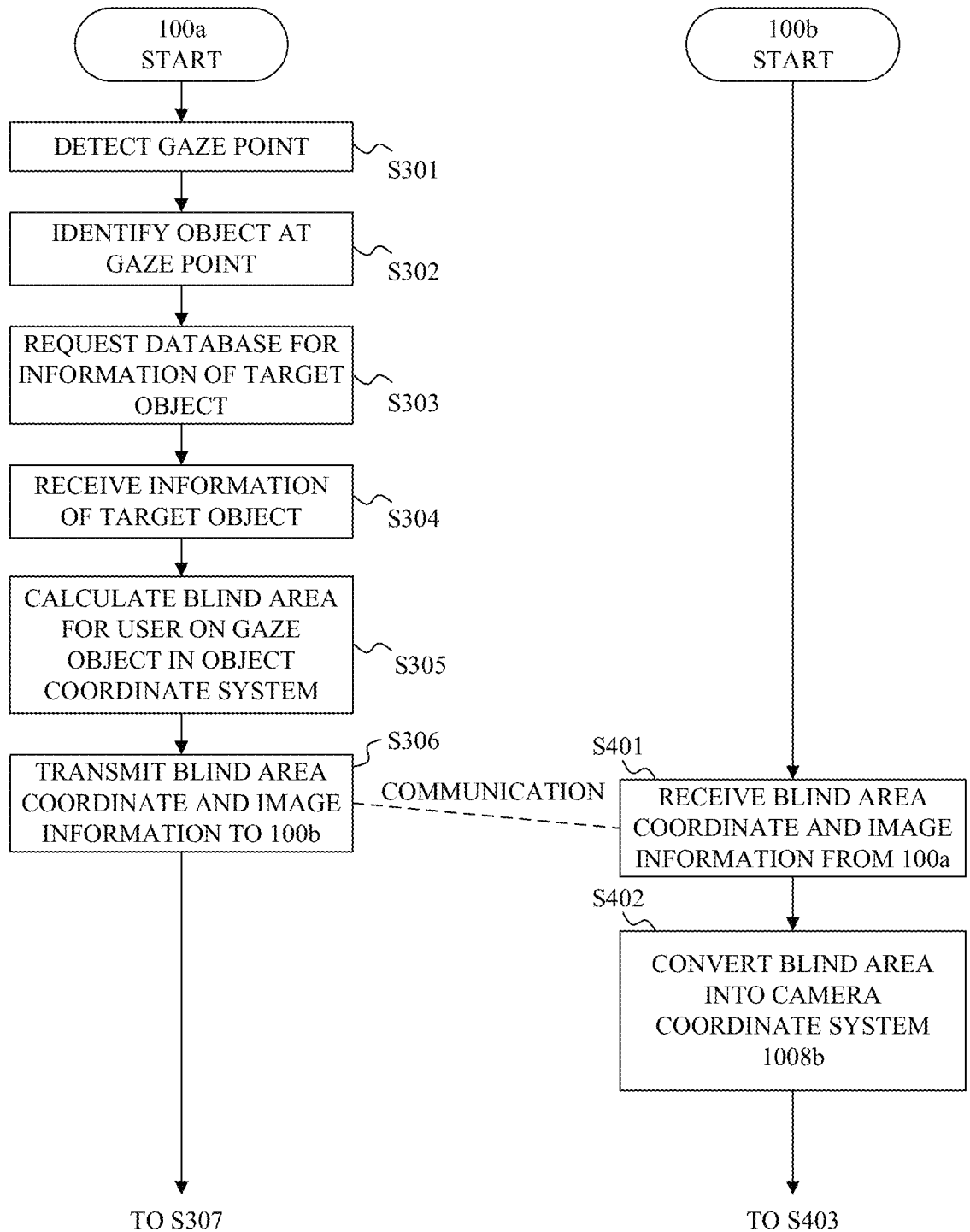
FIGS. 10A and 10B illustrate flowcharts of a method of supporting the user having the blind spot using two wearable terminals according to the second embodiment.
Figure 10B:
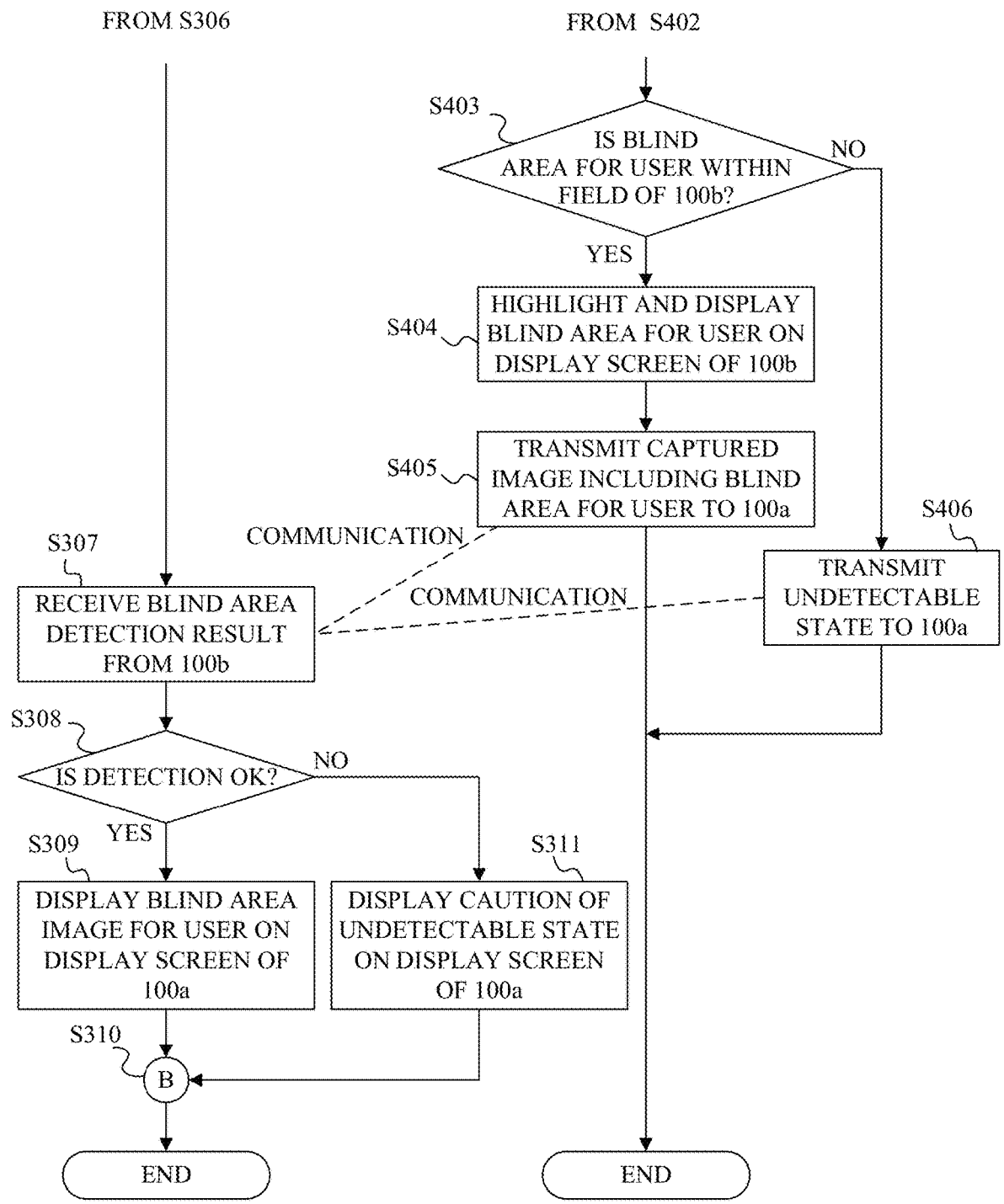

FIGS. 10A and 10B illustrate flowcharts of a method of supporting a user having a blind spot using two wearable terminals 100a and 100b according to this embodiment. Each step in the flowcharts in FIGS. 10A and 10B is implemented, when the system control unit 50 in each wearable terminal 100 loads and executes the program stored in the nonvolatile memory 56 into the system memory 52, and controls each functional block. The system control unit 50 in each of the wearable terminals 100a and 100b repetitively executes the steps S101 to S112 in the first embodiment (FIGS. 7A and 7B). In a case where the system control unit 50 in the wearable terminal 100a determines, in the step S113, that a blind-spot support display is requested via the operating unit 70, the processing flows in FIGS. 10A and 10B are started.

A description will now be given of the steps S301 to S311 of the wearable terminal 100a. Since the step S301 is the same as the step S201, a description thereof will be omitted. Next, in the step S302, the system control unit 50 identifies which object is located at the gaze point. In the example illustrated in FIGS. 9A to 9C, it is determined that the area 1004 on the work target object 1002 is gazed at, and the work target object 1002 is determined to be the gaze target object. Next, in the step S303, the system control unit 50 requests the database server 1010 for information on the work target object 1002.

Next, in the step S304, the system control unit 50 receives three-dimensional data 1020 from the database server 1010. The system control unit 50 aligns the three-dimensional points data and the three-dimensional data 1020 with each other using the three-dimensional shape matching unit 36, and matches the position and the orientation. Next, in the step S305, the system control unit 50 estimates the position and orientation of the wearable terminal 100a in the object coordinate system 1007 based on the matching result of step S304. The blind area 1005 of the wearable terminal 100a is calculated based on the geometrical relationship between the position and orientation of the work target object 1002 and the position and orientation of the wearable terminal 100a. Next, in the step S306, the system control unit 50 transmits the coordinate information on the blind area 1005 in the object coordinate system 1007 and the captured image information on the wearable terminal 100a to the wearable terminal 100b.

Next, in the step S307, the system control unit 50 receives the result of whether or not the blind area 1005 has been detected from the wearable terminal 100b, and the image information if it has been detected. At this time, the system control unit 50 further receives the sensing result of the blind area 1005 by the wearable terminal 100b (corresponding to the result acquired in the steps S107, S108, and S109). Next, in the step S308, the system control unit 50 determines whether there is a proper detection result of the blind area 1005 from the wearable terminal 100b. If it is determined to be YES (detection OK), the flow proceeds to the step S309. If it is determined to be NO (detection NG), the flow proceeds to the step S311.

In the step S309, the system control unit 50 displays on the display unit 29 an image including the blind area 1005 received from the wearable terminal 100b. FIG. 9A illustrates a display example. In FIG. 9A, a display 1110a illustrates an image displayed on the display unit 29 of the wearable terminal 100a. Reference numeral 1002a denotes a work target object 1002 imaged by the wearable terminal 100a, and reference numeral 1003a denotes a work target object 1003. Reference numeral 1004a denotes the (gaze) area 1004 viewed from the wearable terminal 100a. Reference numeral 1120*a* denotes an image captured by and received from the wearable terminal 100*b*. In the received image 1120*a*, reference numeral 1005 denotes a blind area 1005 highlighted by bevel lines.

Next, in the step S310, the system control unit 50 carries out the steps S205 to S212 in the first embodiment (FIGS. 7A and 7B) for the blind area 1005. At this time, the sensing result that is used in the step S205 is the sensing result by the wearable terminal 100*b* received in the step S307.

In the step S311 the system control unit 50 gives caution on the display unit 29 that the wearable terminal 100*b* cannot detect the blind area 1005.

Next, the steps S401 to S406 of the wearable terminal 100*b* will be described. The flow of the steps S401 to S406 is started in a case where the system control unit 50 of the wearable terminal 100*b* determines, in the step S113, that the blind-spot supporting imaging is requested via the communication unit 54.

First, in the step S401, the system control unit 50 receives the coordinate information on the blind area 1005 in the object coordinate system 1007 and the captured image information on the wearable terminal 100*a*. Next, in the step S402, the system control unit 50 converts the received coordinate information on the blind area 1005 into the coordinate on the camera coordinate system 1008*b*. The coordinate transformation is similar to the step S305, and performed through a process of calculating the geometrical relationship between the position and orientation of the work target object 1002 and the position and orientation of the wearable terminal 100*b*. Next, in the step S403, the system control unit 50 determines whether or not the blind area 1005 is included in an imaging field of view of the wearable terminal 100*b* based on the coordinate information on the blind area 1005 on the camera coordinate system 1008*b*. If it is determined to be YES (the blind area 1005 is included in the imaging field of view of the wearable terminal 100*b*), the flow proceeds to the step S404. On the other hand, if it is determined to be NO (the blind area 1005 is located outside the imaging field of view of the wearable terminal 100*b*), the flow proceeds to the step S406.

In the step S404, the system control unit 50 displays and highlights the blind area 1005 on the display unit 29. FIG. 9B illustrates a display example. In FIG. 9B, a display 1110*b* is an image (captured image) displayed on the display unit 29 of the wearable terminal 100*b*. Reference numeral 1002*b* denotes a work target object 1002 captured by the wearable terminal 100*b*, and reference numeral 1003*b* denotes a work target object 1003 captured by the wearable terminal 100*b*. Reference numeral 1005*b* denotes a blind area 1005 viewed from the wearable terminal 100*b*. In the display example, the blind area 1005 is highlighted by bevel lines. Reference numeral 1120*b* denotes an image captured by and received from the wearable terminal 100*a*. In the received image 1120*b*, reference numeral 1004*a* denotes the (gaze) area 1004.

Next, in the step S405, the system control unit 50 transmits the result of the detection presence of the blind area 1005 and the captured image including the blind area 1005 to the wearable terminal 100*a*. At this time, the sensing information on the blind area 1005 by the wearable terminal 100*b* is transmitted to the wearable terminal 100*a* in the form of the table illustrated in FIG. 8.

In the step S406, the system control unit 50 transmits the result of the detection absence of the blind area 1005 to the wearable terminal 100*a*.

The method of providing sensing information by the wearable terminals 100*a* and 100*b* according to this embodiment has been described. Using the plurality of wearable terminals 100*a* and 100*b*, this embodiment can support a certain operator having a blind area, and can present information on the sensing result of the blind area. Receiving the image information on the blind area from the other wearable terminal 100 and displaying it on the display unit 29 can prevent the blind spot from being overlooked in the work.

In this embodiment, in the step S306, the wearable terminal 100*a* converts the coordinate of the blind area 1005 into the object coordinate system 1007 and then transmits it to the wearable terminal 100*b*, but the method is not limited to this method. For example, the wearable terminal 100*b* may receive the coordinate of the blind area 1005 in the camera coordinate system 1008*a* and perform the coordinate conversion. Alternatively, the wearable terminal 100*b* may receive the captured image information including the blind area 1005 from the wearable terminal 100*a* and perform the coordinate conversion based on the captured image information. Moreover, the database server 1010 may perform the coordinate conversion between the object coordinate system 1007 and each camera coordinate system.

Figure 11:
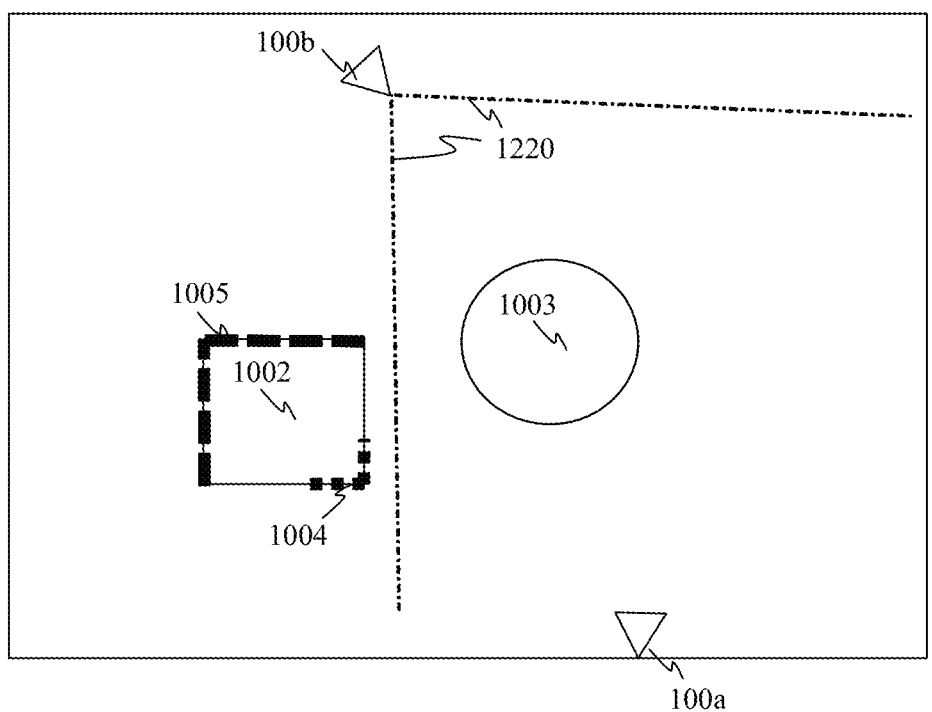
FIG. 11 is a display example of positional relationship information shared between the two wearable terminals according to the second embodiment.

This embodiment transmits, in the step S406, the fact that the blind area 1005 is undetectable to the wearable terminal 100*a*, but information on a positional relationship between each wearable terminal 100 and the target object may be created and shared. FIG. 11 is a display example of positional relationship information shared by the wearable terminals 100*a* and 100*b*. For example, a map may be displayed so that the wearable terminals 100*a* and 100*b* and the work target objects 1002 and 1003 can be viewed from above. In FIG. 11, a dotted line illustrated by 1220 represents an imaging viewing angle of the wearable terminal 100*b*, and clearly indicates that the blind area 1005 is out of the field of view. Thereby, the worker 1001*b* can recognize a direction in which the blind area 1005 can be imaged. The worker 1001*a* can recognize whether or not there is another worker who can image the blind area 1005 nearby.

This embodiment does not need the database server 1010. For example, in one method, the three-dimensional data and the sensing result required for the storage device of each wearable terminal 100 are distributed and stored, and the necessary data may be received from the wearable terminal 100 possessing it.

This embodiment identifies the gaze object using the gaze detecting unit, but is not limited to this method. The work target object may be specified by a selection of a certain operating unit.

This embodiment uses the same hardware configuration for both the wearable terminals 100*a* and 100*b*, but may use different hardware as long as the hardware configuration can support the blind spot. For example, a handheld camera instead of a wearable terminal may be used. Alternatively, an autonomous mobile terminal, such as a drone and a mobile robot, may be used.

This embodiment uses two terminals, the wearable terminals 100*a* and 100*b*, but the present invention is not limited to this configuration, and may use any number of terminals. Applying this embodiment can transmit the captured image of the terminal that could capture the blind area to the terminal of the main worker. This configuration can provide the effect of reducing a communication amount between a plurality of terminals. It is annoying to display imaging information on all terminals on the terminal of the main worker. Applying this embodiment can transmit only the captured image of the terminal that could capture the necessary blind area, and the annoyance can be reduced.

Third Embodiment

Figure 12:
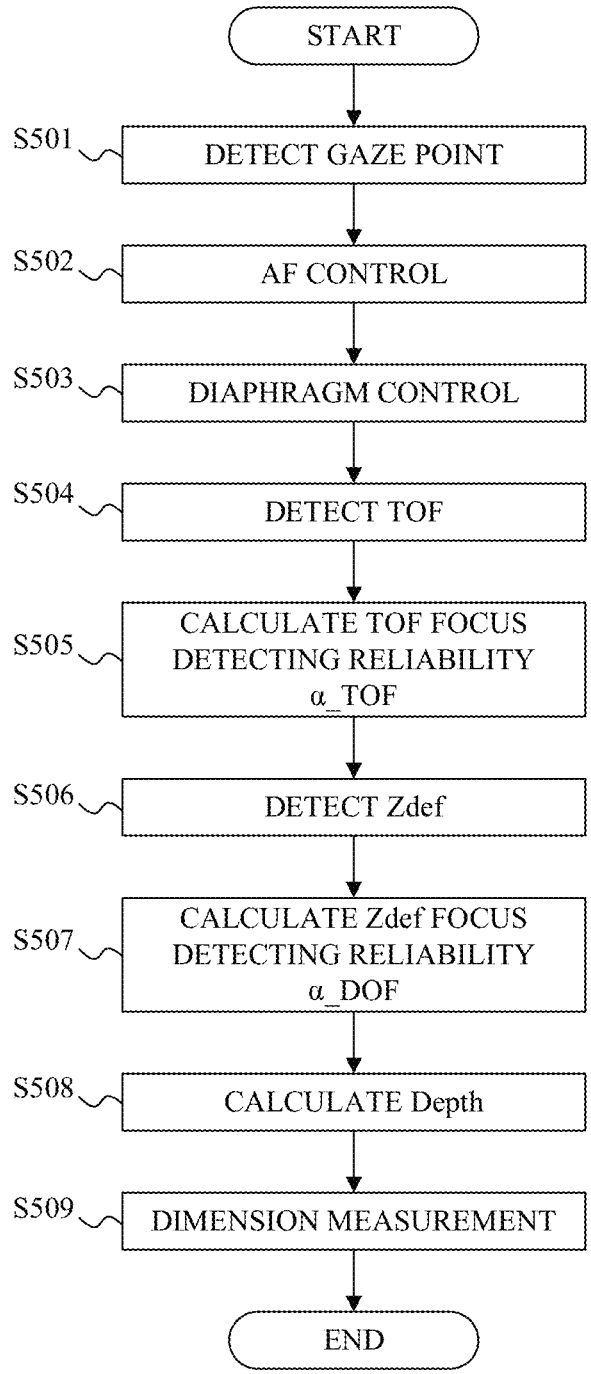
FIG. 12 is a flowchart of a method of measuring dimension using a wearable terminal according to a third embodiment.
Figure 13A:
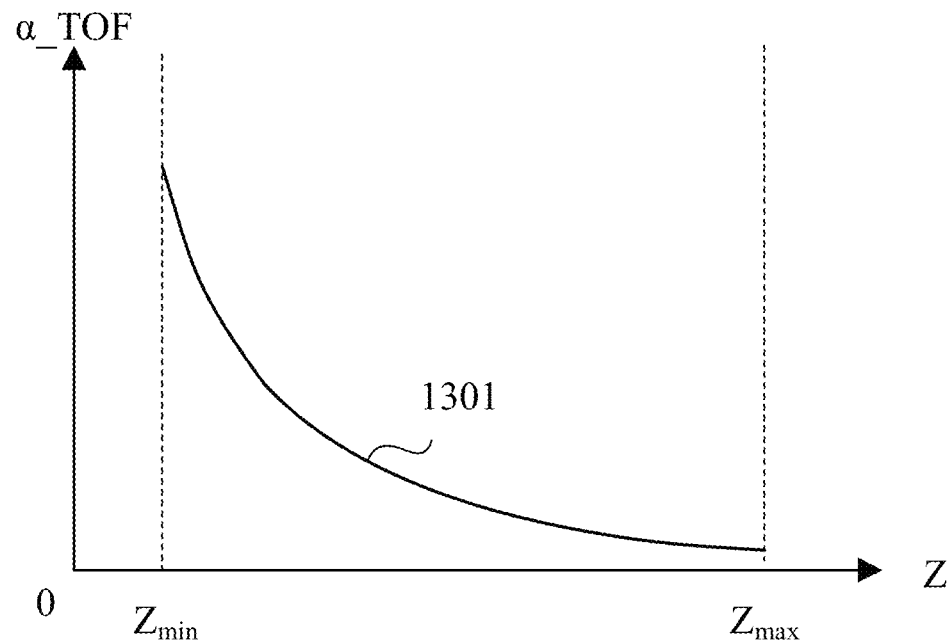
FIGS. 13A and 13B explain the distance measurement reliability of two distance measurement units mounted on the wearable terminal according to the third embodiment.
Figure 13B:
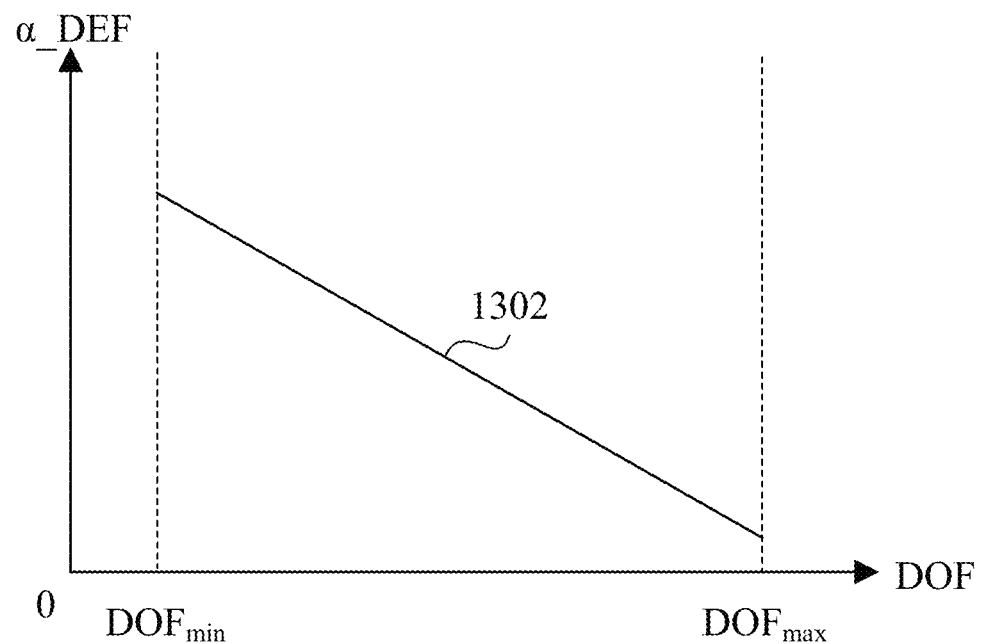

Referring now to FIGS. 12, 13A, and 13B, a description will be given of a method of providing sensing information by the wearable terminal 100 according to a third embodiment of the present invention. As illustrated in the external view illustrated in FIG. 1, the TOF detecting unit (second distance measurement unit) 83 is disposed outside both lens optical systems of the imaging units 150R and 150L, and has an angle of view wider than that of the imaging unit (first distance measurement unit) 22. Its detection range covers several meters, and the distance measurement resolution depends on the distance to the measurement target. In the imaging-plane phase-difference distance measurement method of the imaging unit 22, the distance measurement accuracy varies depending on the lens parameter represented by the optical zoom magnification in each of the imaging units 150R and 150L. This embodiment will discuss a method for improving the distance measurement accuracy in a configuration mounted with a distance measurement sensor depending on a distance measurement distance and a distance measurement sensor depending on a lens mechanism.

FIG. 12 is a flowchart of a dimension measuring method by the wearable terminal 100 according to this embodiment. Each step in the flowchart illustrated in FIG. 12 is implemented by the system control unit 50 in the wearable terminal 100 loading the program stored in the nonvolatile memory 56 into the system memory 52, executing the program, and controlling each functional block. The system control unit 50 in the wearable terminal 100 repetitively executes the flow of the steps S101 to S112 in the first embodiment (FIGS. 7A and 7B). In the step S107, when the system control unit 50 measures the dimension of the work target object 1003 using the dimension measuring unit 39, the processing flow illustrated in FIG. 12 is started.

Since the step S501 is the same as the step S201, a description thereof will be omitted. Next, in the step S502, the system control unit 50 executes AF processing for focusing on the gaze point by moving the focus lens in the lens 103 via the AF driving circuit 3. Next, in the step S503, the system control unit 50 performs AE processing on the gaze point and controls the aperture in the diaphragm 1 so that the exposure in the imaging unit 22 has a proper amount. At this time, the exposure time of the imaging unit 22 and the conversion gain in the photoelectric conversion may be changed. Next, in the step S504, the system control unit 50 irradiates infrared light using the infrared LED illumination unit (second distance measurement unit) 81, measures the time lag of the reflected light using the TOF detecting unit 83, and calculates a distance D_TOF to the object near the gaze point.

Next, in the step S505, the system control unit 50 calculates the distance measurement reliability (second reliability) α_TOF by the TOF detecting unit 83 as illustrated in the following expression (9):

$$\alpha\_TOF = k1 \cdot (d_{Tmax} - d_{TOF})/d_{Tmax} \quad (9)$$

where k1 is a constant, $d_{TOF}$ is a distance measurement resolution illustrated in the expression (1), $d_{Tmax}$ is a maximum distance measurement resolution, and $d_{TOF}$ has a value equal to or lower than $d_{Tmax}$ within the effective distance measurement range. The number of effective signal electrons N illustrated in the expression (1) depends on the distance of the object. For example, a relationship between the object distance and the number of effective signal electrons N may be tabulated and stored in the nonvolatile memory 56 in advance.

Next, in the step S506, the system control unit 50 calculates the distance D_DEF to the object at or near the gaze point by the imaging-plane phase-difference distance measurement method of the imaging unit 22. Next, in the step S507, the system control unit 50 calculates the distance measurement reliability (first reliability) α_DEF by the imaging-plane phase-difference distance measurement method of the imaging unit 22 as illustrated in the following expression (10):

$$\alpha\_DEF = k2 \cdot (d_{Dmax} - d_{DEF})/d_{Dmax} \quad (10)$$

where k2 is a constant, $d_{DEF}$ is a distance measurement resolution illustrated in the expression (8), $d_{Dmax}$ is a maximum distance measurement resolution, and $d_{DEF}$ has a value equal to or lower than $d_{Dmax}$ within a range of the effective defocus amount.

Next, in the step S508, the system control unit 50 calculates a distance measurement result Depth for the target object by the following expression (11):

$$Dept = D\_DEF \cdot \alpha\_DOC/(\alpha\_DEF + \alpha\_TOF) + D\_TOF \cdot \alpha\_TOF/(\alpha\_DEF + \alpha\_TOF) \quad (11)$$

The expression (11) is equivalent with setting each distance measurement reliability illustrated in the expressions (9) and (10) to a weight and calculating an internal division point of the distance measurement result by both distance measurement units. The distance measurement result reflecting each reliability can be obtained by the expression (11).

Next, in the step S509, the system control unit 50 transmits the Depth measurement result to the dimension measuring unit 39, and measures the dimension of the measurement target. FIGS. 13A and 13B explain the distance measurement reliabilities of the two distance measurement units mounted on the wearable terminal 100. Reference numeral 1301 in FIG. 13A is a graph illustrating a relationship between the distance Z from the TOF detecting unit 83 to the distance measurement target and the distance measurement reliability α_TOF. Assume that the distance measurement reliability α_TOF is valid at a distance between the minimum measurement distance $Z_{min}$ and the maximum measurement distance $Z_{max}$, and is invalid at other distances (α_TOF=0). The distance measurement reliability α_TOF has a higher value as the distance measurement target is closer to the minimum measurement distance $Z_{min}$, and has a lower value as the distance measurement target is farther.

Reference numeral 1302 in FIG. 13B is a graph illustrating a relationship between the depth of field DOF of the lens 103 and the distance measurement reliability α_DEF. Assume that the distance measurement reliability α_DEF is valid at a depth of field between the minimum depth of field $DOF_{min}$ and the maximum depth of field $DOF_{max}$, and is invalid at other depths of field (α_DEF=0). The distance measurement reliability α_DEF has a higher value when the depth of field at the position of the distance measurement target is shallower than the minimum depth of field $DOF_{min}$, and has a lower value when the depth of field is deeper. For example, in a case where the distance measurement target is relatively close, the distance measurement reliability α_TOF has a high value.

When the optical zoom magnification of the lens 103 is lowered in order for the user to view a close position, the depth of field DOF becomes deeper and the distance measurement reliability α_DEF has a lower value. As a result, a reference ratio of D_TOF is increased in the Depth calculation. For example, in a case where the distance measurement target is located at a relatively distant position, the distance measurement reliability α_TOF has a low value. On the other hand, when the optical zoom magnification of the lens 103 is increased in order for the user to view a distant position, the depth of field DOF becomes shallower and the distance measurement reliability α_DEF has a higher value. As a result, a reference ratio of D_DEF is increased in the Depth calculation. Thus, the expression (11) can improve the distance measurement accuracy by taking advantage of both distance measurement methods according to the position of the distance measurement target.

In this embodiment, the wearable terminal 100 includes a first distance measurement unit (imaging unit 22) and a second distance measurement unit (infrared LED illumination unit 81, TOF detecting unit 83). The wearable terminal 100 further includes a first calculating unit, a second calculating unit, and a control unit (system control unit 50) that serves as a third calculating unit. The first calculating unit calculates the first reliability (first distance measurement reliability) regarding the first distance measurement result by the first distance measurement unit. The second calculating unit calculates the second reliability (second distance measurement reliability) regarding the second distance measurement result by the second distance measurement unit. The third calculating unit calculates a distance measurement result by changing a reference ratio between the first distance measurement result and the second distance measurement result, based on the first reliability and the second reliability. The first reliability is lower as the depth of field of the lens unit at the distance measurement target position is deeper. The second reliability is lower as the position of the distance measurement target is farther from the second distance measurement unit.

In this embodiment, the wearable terminal 100 may include a determining unit (gaze determining unit 43) for determining the gaze area (area 1006) that the user is gazing at. The first distance measurement unit enables the lens unit (lens 103) to be focused on the gaze area, and performs a distance measurement at the in-focus target position. The second distance measurement unit may contain the first distance measurement angle of view of the first distance measurement unit and is wider than the first distance measurement angle of view.

The method of providing the sensing information by the wearable terminal 100 according to this embodiment has been described. This embodiment can improve the distance measurement accuracy by integrating the output results from a plurality of distance measurement units by the wearable terminal 100.

The SNR of the TOF detecting method depends on the reflected light amount of the distance measurement target. The number of effective signal electrons N represented by the expression (1) is affected not only by the distance but also by the reflectance of the object and the ambient light. Therefore, the distance measurement reliability α_TOF may have a value that depends on the object and the scene. For example, the object may be identified by deep learning from the captured image by the imaging unit 22, and an estimated value of the number of effective signal electrons N may be changed according to the reflectance of the object. Similarly, the scene may be identified by deep learning, and the estimated value of the number of effective signal electrons N may be changed, for example, by a difference between a day scene and a night scene.

The TOF detecting method is bad at detecting transparent or translucent objects. For example, if it is determined to be a transparent object based on the object identification result, a value of α_TOF may be set to zero. That is, in the case where the object is a transparent object or a translucent object, the control unit (system control unit 50) may set the second reliability to zero. From the expression (11), only the result of the imaging-plane phase-difference distance measurement method is referred to, and an erroneous detection result for the transparent object by the TOF can be avoided.

In this embodiment, the control unit may set the second reliability to zero in a case where the distance to the distance measurement target is shorter than the shortest measurable distance of the second distance measurement unit, or in a case where the distance to the distance measurement target is longer than the longest measurable distance of the second distance measurement unit. The control unit may set the first reliability to zero in a case where the depth of field of the lens unit is shallower than the minimum depth of field of the first distance measurement unit, or in a case where the depth of field of the lens unit is deeper than the maximum depth of field of the first distance measurement unit.

The distance measurement accuracy by the imaging-plane phase-difference distance measurement method depends on the focal length of the lens 103 and the aperture in the diaphragm as illustrated in the expression (8). For example, a lower limit threshold may be set for the value of α_DEF, and the focal length and the aperture in the diaphragm may be changed in a case where the value is lower than the lower limit threshold. More specifically, in the case where the value of α_DEF is lower than the lower limit threshold, the value of α_DEF can be improved by increasing the optical zoom magnification. If an exposure amount does not reach a saturation upper limit value of the imaging unit 22, the value of α_DEF can be improved by an opening control of the aperture in the diaphragm. That is, in this embodiment, the wearable terminal 100 may include a zoom changing unit (lens system control circuit 4) for changing the zoom magnification of a zooming unit in the lens 103, and a diaphragm changing unit (diaphragm driving circuit 2) for changing the aperture in the diaphragm 1. In the case where the first reliability is smaller than a predetermined threshold, the control unit controls at least one of the zoom changing unit and the diaphragm changing unit so that the first reliability becomes higher.

In this embodiment, the defocus amount is generated based on, but is not limited to, images having a parallax by the image-plane phase-difference distance measurement method (phase-difference detecting method). For example, a Depth from Defocus ("DFD") method may be used in which the defocus amount is calculated from the correlation between two images having different focus and F-number. Alternatively, a Depth from Focus method may be used. The present invention can be similarly implemented regardless of the defocus amount obtained by either method.

This embodiment uses the distance measurement result by the TOF detecting unit 83, but the present invention is not limited to this method. For example, a focusing detecting method may use a parallax between two images such as a stereo camera. Another method may be a method of emitting ultrasonic waves to an object like a sonar and performing a distance measurement from a time difference of the reflected sound waves. Still another method is an active stereo method that irradiates geometrically patterned light and performs a distance measurement from a geometric shape of the reflection pattern. That is, as long as the distance measurement performance depends on the distance, this embodiment is similarly applicable.

Fourth Embodiment

Referring now to FIGS. 14 to 18, a description will be given of a method of controlling the display sensitivity by the wearable terminal 100 according to a fourth embodiment of the present invention. The control of the display sensitivity relates to a control over a display angle of view when the object is enlarged, displayed, and visually recognized using the wearable terminal 100.

Figure 14:
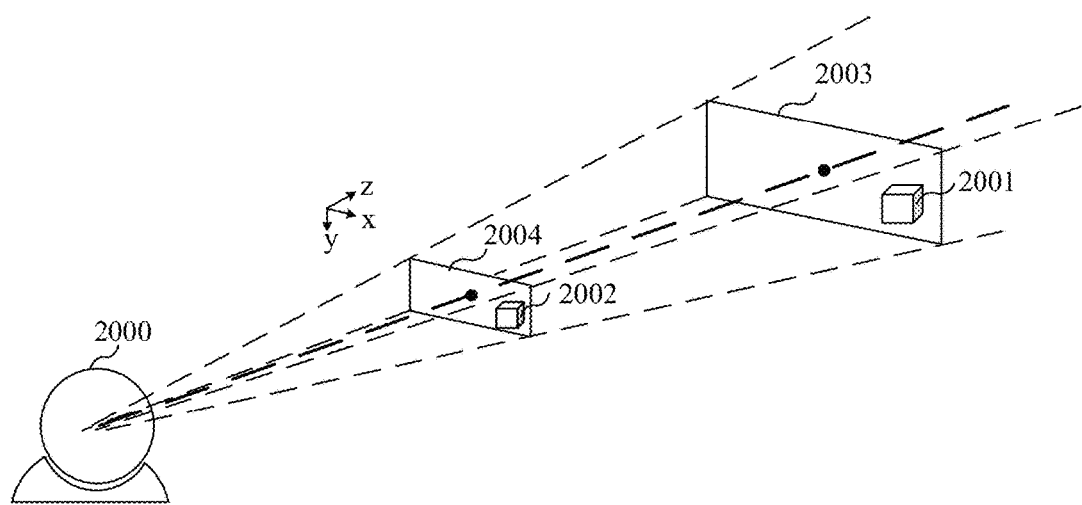
FIG. 14 explains a relationship between an imaging angle of view and a display angle of view of a wearable terminal according to a fourth embodiment.

FIG. 14 explains a relationship between the imaging angle of view and the display angle of view of the wearable terminal 100 in this embodiment, and illustrates a relationship between the imaging unit 22 and the display unit 29 when a user 2000 visually recognizes the object at a telephoto position. An angle of view (captured image) 2003 of the imaging unit 22 indicates an angle of view of the imaging unit 22, and images an object 2001 and a peripheral area of the object 2001. An angle of view 2004 of the display unit 29 illustrates an angle of view of a display image obtained by cutting out part or whole of the image captured by the imaging unit 22 by the image processing unit 24 and displaying on the display unit 29 at a specific magnification. The object image 2002 in the angle of view 2004 of the display unit 29 is an enlarged display at a specific magnification of the object 2001 in the angle of view 2003 of the imaging unit 22.

Figure 15:
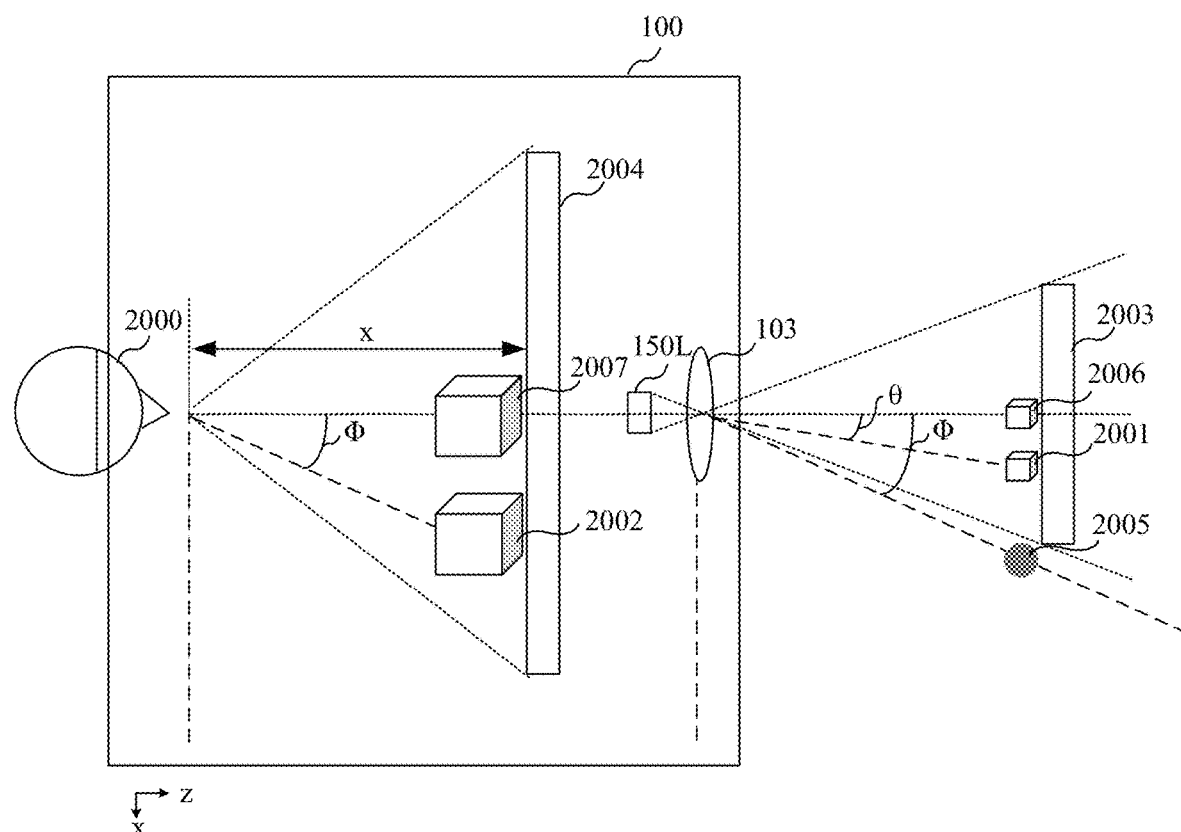
FIG. 15 is a bird's-eye view of the relationship between the imaging angle of view and the display angle of view of the wearable terminal according to the fourth embodiment.

FIG. 15 is a bird's-eye view of FIG. 14 viewed from the Y-axis direction. A description of the elements designated by the same reference numerals as those in FIG. 14 will be omitted. FIG. 15 is a display in a case where a specific magnification displayed on the display unit 29 is set to a, times. Although the imaging unit 150L is taken as an example, the control over the imaging unit 150R is similar. An object image 2007 at the center of the angle of view 2004 of the display unit 29 is an enlarged display at a specific magnification of an object 2006 at the center of the angle of view 2003 of the imaging unit. Now assume that θ is an angle between the object 2001 imaged on the imaging unit 150L and the optical axis, and Φ is an angle between the center of the angle of view 2004 of the display unit 29 and the object image 2002.

In a case where the gaze point of the user 2000 is in the object image 2007 and the gaze point is moved to the object image 2002, the user 2000 changes the direction of his head by Φ based on the display image of the display unit 29. In the wearable terminal 100 attached to the head of the user 2000, since the imaging unit 150L and the display unit 29 are integrated, the direction of the imaging unit 150L is also changed by Φ, and the optical axis is moved to a point 2005. The user 2000 wants to visually recognize the object image 2002, but the display unit 29 enlarges the display by α times and thus the object 2001 is consequently lost. FIG. 15 is an example illustrating the movement of the head in the horizontal direction, which is the X-axis, using a bird's-eye view viewed from the Y-axis direction, but this is similarly applicable when the head is moved in the vertical direction on the unillustrated Y-axis.

Figure 16A:
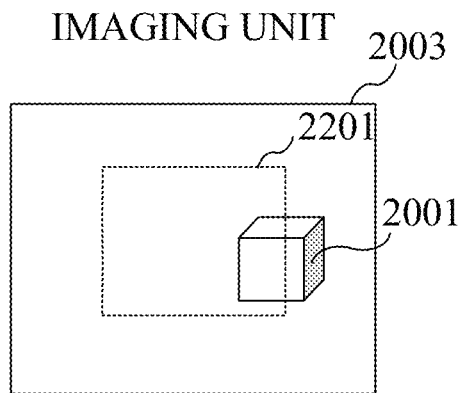
FIGS. 16A to 16F explain display angle of view control for a translational movement of the wearable terminal according to the fourth embodiment.
Figure 16B:
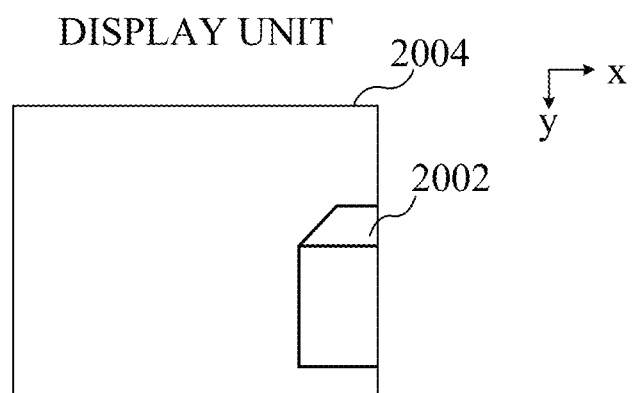
Figure 16C:
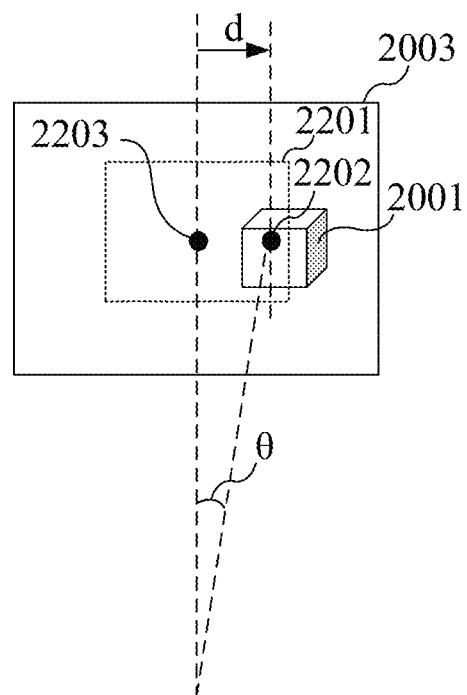
Figure 16D:
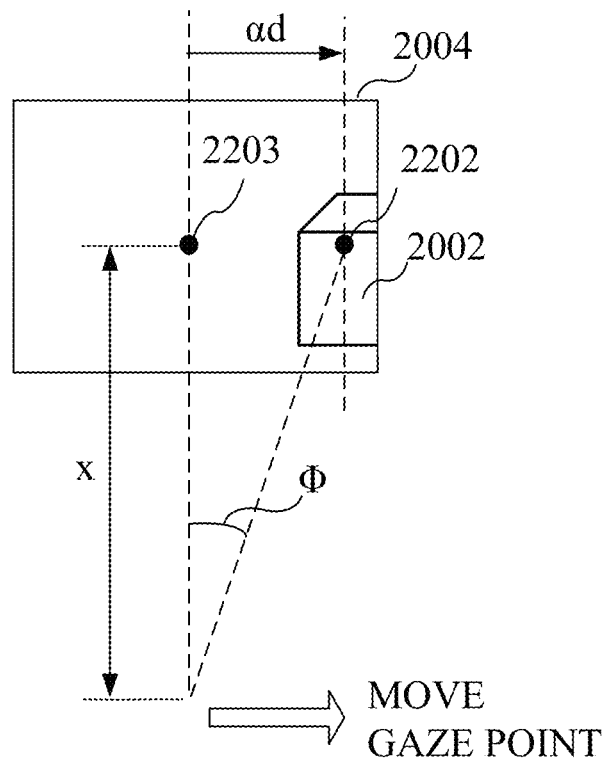
Figure 16E:
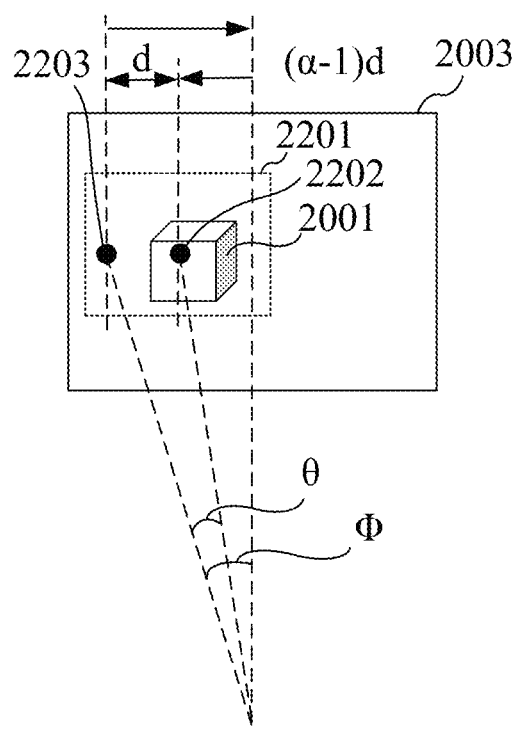
Figure 16F:
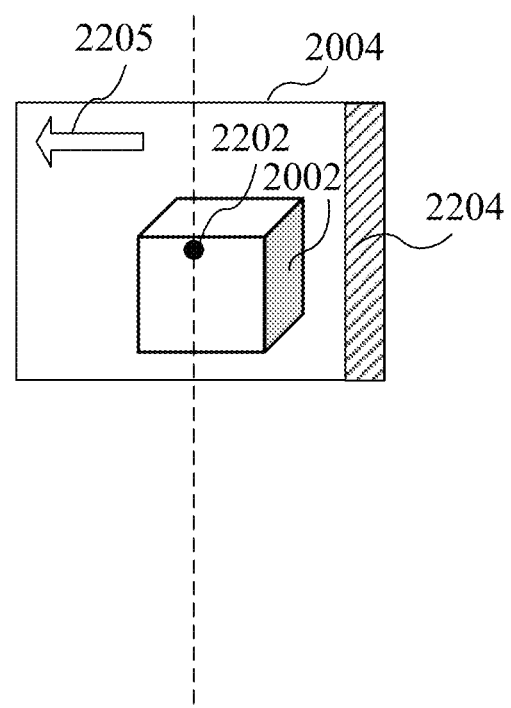

FIGS. 16A to 16F explain control over a display angle of view for a translational movement of the wearable terminal 100, and illustrate an image formed on the imaging unit 150L in FIG. 15 and a display image on the display unit 29. A description the elements designated by the same reference numerals as those in FIG. 14 will be omitted. FIG. 16A illustrates the angle of view 2003 of the imaging unit, and illustrates a relationship between a cutout angle of view 2201 and the object 2001. FIG. 16B illustrates the angle of view 2004 of the display unit, which is the same as the cutout angle of view 2201 in FIG. 16A, and as illustrated in FIG. 15, part of the angle of view 2003 of the imaging unit is displayed and enlarged on the display unit 29 at a magnification of α times. A relationship between FIGS. 16C and 16D and a relationship between FIGS. 16E and 16F are similar to the relationship between FIGS. 16A and 16B.

Figure 18:
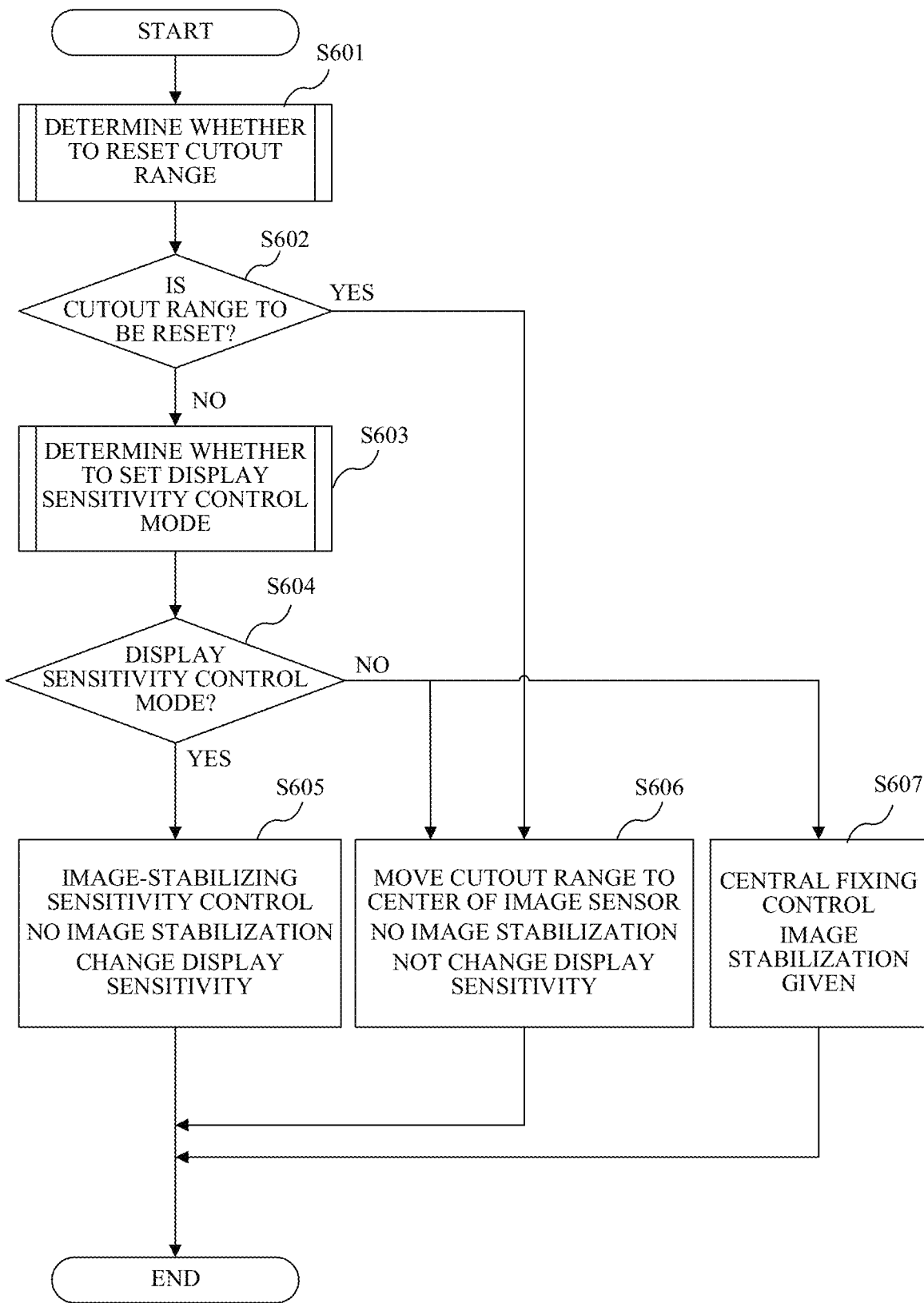
FIG. 18 is a flowchart of the display angle of view control by the wearable terminal according to the fourth embodiment.

FIG. 18 is a flowchart of control over the display angle of view by the wearable terminal 100. First, in the step S601, the system control unit 50 determines whether to reset a cutout range of the imaging unit 150L. The cutout range resetting in this embodiment means returning a center coordinate of a cutout angle of view 2201 to the center of the angle of view 2003 of the imaging unit. For example, the user 2000 operates the operating unit (reset operating unit) 70 to perform the reset operation. Next, in the step S602, the system control unit 50 determines whether or not to reset the cutting range. If the cutting range is to be reset, the flow proceeds to the step S606. On the other hand, if the cutout range is not to be reset, the flow proceeds to the step S603.

In the step S603, the system control unit 50 determines whether to set the display sensitivity control mode. The display sensitivity control mode is determined by the user 2000 selecting a mode in advance using the operating unit (mode selecting unit) 70, or by the gaze determining unit (determining unit) 43 based on whether or not a specific object is gazed. If the gaze determination by the gaze determining unit 43 is used to determine whether to set the display sensitivity control mode and gazing is determined by the gaze determining unit 43, the display sensitivity control mode is set and if gazing is not determined by the gaze determining unit 43, no display sensitivity control mode is set.

Next, in the step S604, the system control unit 50 determines whether or not the display sensitivity control mode is set (whether or not the display sensitivity control is performed). If the display sensitivity control is to be made, the flow proceeds to the step S605. On the other hand, if no display sensitivity control is performed, the flow proceeds to the step S606 or S607.

Referring now to FIGS. 16A to 16F, a description will be given of control over the display angle of view for the translational movement of the angle of view 2003 of the imaging unit 22 in the display sensitivity control in the step S605. As illustrated in FIG. 16D, assume a case where the center of the angle of view 2004 of the display unit at a first gaze point 2203 is moved to a second gaze point 2202. In the angle of view 2004 of the display unit 29 in FIG. 16D, Φ is an angle between the first gaze point 2203 and the second gaze point 2202. x is a distance between the user wearing the wearable terminal 100 and the display unit 29, and αd is a distance between the first gaze point 2203 and the second gaze point 2202 on the display unit 29. A distance d is a distance between the first gaze point 2203 and the second gaze point 2202 on the angle of view 2003 of the imaging unit 22, which will be described below. The distance αd is a distance obtained by multiplying the distance d by a magnification of α times. Hence, the distance αd is equal to x tan Φ, and the distance between the first gaze point 2203 and the second gaze point 2202 on the display unit 29 in the case where the user moves his head by the angle Φ can be calculated.

On the other hand, as illustrated in FIG. 16C, when viewed based on the angle of view 2003 of the imaging unit, θ is an angle between the first gaze point 2203 and the second gaze point 2202, and d is a distance between the first gaze point 2203 and the second gaze point 2202 on the angle of view 2003 of the imaging unit 22 at this time. FIG. 16E illustrates the angle of view 2003 of the imaging unit when the user 2000 moves his head by Φ in order to move the center of the angle of view from the first gaze point 2203 to the second gaze point 2202 based on the angle of view 2004 of the display unit 29 illustrated in FIG. 16D. The first gaze point 2203 is moved to a position separated by αd from the center of the angle of view 2003 of the imaging unit. At this time, a cutout angle of view 2201 is moved by a distance (α−1)d so that the angle is θ between the center of the cutout angle of view 2201 and the first gaze point 2203, which was the center of the angle of view 2003 of the imaging unit before the user 2000 moves his head. Moving the cutout angle of view 2201 from the center of the angle of view 2003 of the imaging unit in this way, as illustrated in FIG. 16F can control the angle of view 2004 of the display unit so as to display the second gaze point 2202 at the center.

A moving amount between the first gaze point 2203 and the second gaze point 2202 of the user has been described. In other words, a cutout position of the captured image is changed so that a moving amount of a projected point between moving imaging frames of the wearable terminal 100 and a moving amount of the projected point between display frames match with respect to an arbitrary projected point of the object. Here, the moving amount of the projected point between the imaging frames means a moving amount in the coordinate system normalized by the maximum number of pixels on the x-axis and the y-axis of the imaging frame. Similarly, the moving amount of the projected point between the display frames means a moving amount in the coordinate system normalized by the maximum number of pixels on the x-axis and the y-axis of the display frame.

In the example of FIG. 16E, the cutout angle of view 2201 is the cutout position near the left end of the angle of view 2003 of the imaging unit, and there is little room for moving the cutout position to the left. In this case, as illustrated in FIG. 16F, a cutout position caution 2204 is displayed at the right end of the angle of view 2004 on the display unit, or a direction indicating bar (auxiliary display) 2205 is displayed to give a caution notification of the display sensitivity control limit to the user 2000. Alternatively, in a case where the imaging unit 150L has an optical zoom (not shown), the object image 2002 may be controlled so as not to deviate from the angle of view 2003 of the imaging unit by controlling the optical zoom to the wide-angle side.

Figure 17A:
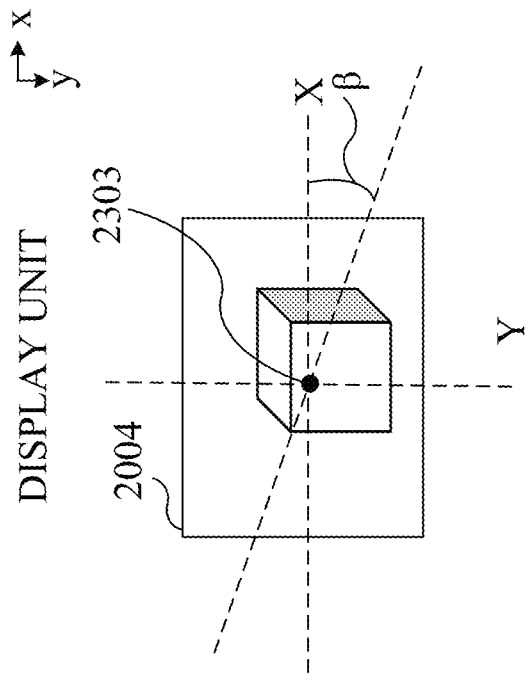
FIGS. 17A to 17D explain the display angle of view control for an optical-axis rotation of the wearable terminal according to the fourth embodiment.
Figure 17B:
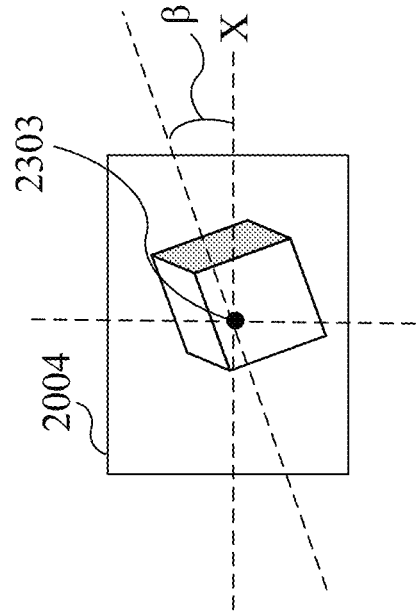
Figure 17C:
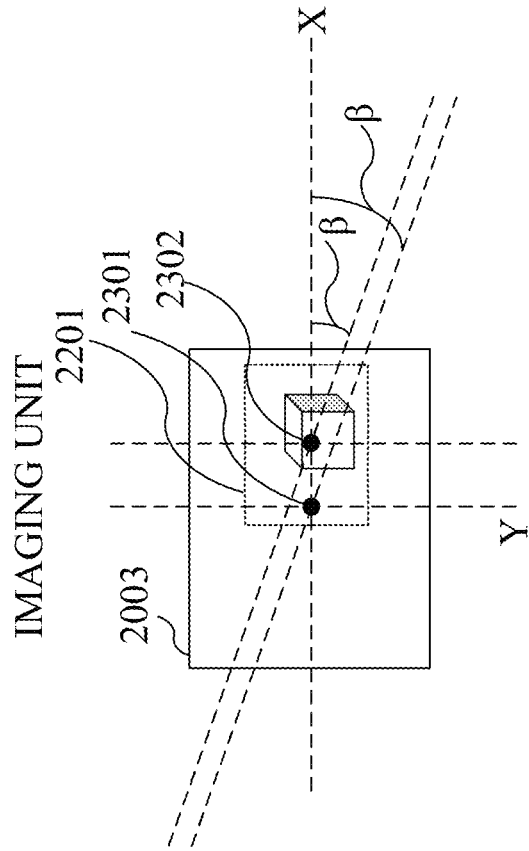
Figure 17D:
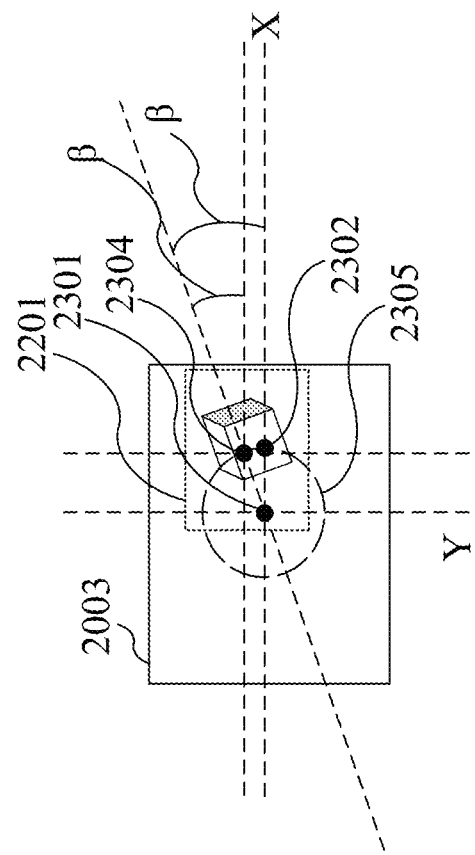

Referring now to FIGS. 17A to 17D, a description will be given of control over the display angle of view against a rotation of the angle of view 2003 of the imaging unit 22 about the optical axis in the display sensitivity control in the step S605 illustrated in FIG. 18. FIGS. 17A to 17D explain control over the display angle of view against the rotation about the optical axis of the wearable terminal 100. FIG. 17A illustrates the angle of view 2003 of the imaging unit, and illustrates a relationship between an angle of view center 2301 of the imaging unit, a cutout angle of view 2201, and a first coordinate point 2302. The first coordinate point 2302 is located at the center of the cutout angle of view 2201 and corresponds to an angle of view center (center on the display image) 2303 of the display unit. FIG. 17B illustrates the angle of view 2004 of the display unit 29, which is the same as the cutout angle of view 2201 illustrated in FIG. 17A, and as illustrated in FIG. 15, part of the angle of view 2003 of the imaging unit is displayed and enlarged at a magnification of α times on the display unit 29. A relationship between FIGS. 17C and 18D is the same as the relationship between FIGS. 17A and 17B.

Now assume a case where the user 2000 rotates his head by an angle β in order for the user 2000 who is viewing the angle of view 2004 of the display unit illustrated in FIG. 17B to rotate about the angle of view center 2303 of the display unit as an axis by the angle β based on the angle of view 2004 of the display unit 29. FIG. 17C illustrates the angle of view 2003 of the imaging unit when the user 2000 rotates his head by the angle β in order to display and rotate about the angle of view center 2303 of the display unit 29 as an axis by the angle β.

At this time, the center of the cutout angle of view 2201 is moved from the first coordinate point 2302 to a second coordinate point 2304. The second coordinate point 2304 is an endpoint different from the angle of view center 2301 of the imaging unit when a line segment made by connecting the angle of view center 2301 of the imaging unit and the first coordinate point 2302 is rotated by an angle β about the angle of view center 2301 of the imaging unit. As a result of moving the center of the cutout angle of view 2201 to the second coordinate point 2304, the angle of view 2004 of the display unit is obtained which is rotated by the angle β about the angle of view center 2303 of the display unit illustrated in FIG. 17D. Similarly, in a case where the imaging unit 150L is rotated about the angle of view center 2301 of the imaging unit, the center point of the cutout angle of view 2201 is moved on a circle 2305 having a radius from the first coordinate point 2302 of the imaging unit to the angle of view center 2303.

In the step S606 illustrated in FIG. 18, an image having a specific magnification is displayed on the display unit 29 while the center of the cutout angle of view 2201 at the angle of view 2003 of the imaging unit 22 and the angle of view center 2301 of the imaging unit are always accorded with each other. In the step S607, display fixing control is performed for such control that an arbitrary projected point on the object at the angle of view 2003 of the imaging unit is fixed on the angle of view 2004 of the display unit 29. The display fixing control is performed in a normal digital camera as an image stabilizing control, and a detailed description thereof will be omitted because it is a known technique.

Thus, in this embodiment, the system control unit 50 may fix the cutout position to the center of the captured image in the case where the first mode is selected by the operating unit (mode selecting unit) 70 that accepts a mode selection from the user. In the case where the second mode is selected by the mode selecting unit, the control unit may change the cutout position so that the projected point displayed at each coordinate of the display image is maintained at each coordinate of the display image. The wearable terminal 100 may include a determining unit (gaze determining unit 43) for determining whether or not the user is gazing at a specific object, and the control unit may fix the cutout position at the center of the captured image in the case where the user is not gazing at the specific object. In the case where the cutout position includes a predetermined range near the end of the captured image, the control unit may change a display color of part of the display image according to the predetermined range included in the cutout position. In the case where the cutout position includes a predetermined range near the end of the captured image, the control unit may display an auxiliary display (direction indicating bar 2205) indicating a direction according to the predetermined range included in the cutout position. The wearable terminal 100 may include a zoom changing unit (lens system control circuit 4) that can provide optical zooming by controlling the lens 103. In the case where the cutout position includes the predetermined range near the end of the captured image, the control unit may perform zoom-out control by using the zoom changing unit.

The method of providing sensing information by the wearable terminal 100 in this embodiment has been described. This embodiment performs the display sensitivity control that combines the control over the display angle of view against a translational movement and the control over the display angle of view against a rotation about the optical axis as a center, and can present image information with less discomfort for the intended operation for moving the viewpoint of the user 2000. In the display sensitivity control, a configuration may be used which enables the user 2000 to independently turn on and off the control over the display angle of view against the translational movement and the control over the display angle of view against the rotation about the optical axis as a center. In this embodiment, the image acquired by the imaging unit 22 is enlarged and displayed on the display unit 29, but a configuration including the imaging unit 150L and the display unit 160L capable of displaying a wider angle range than the see-through display may provide the display sensitivity control.

In each embodiment, the system control unit 50 may provide controls through single hardware or the entire apparatus may be controlled by a plurality of hardware components sharing the processes.

Fifth Embodiment

In this embodiment, a description will be given of a driving support system of a vehicle using the wearable terminal described in the second embodiment. Since the basic configuration is the same as that of the second embodiment, the differences will be described.

In this embodiment, the wearable terminal 100a is worn by a driver who drives the vehicle. The electronic apparatus that transmits image data to the wearable terminal 100a worn by the driver is an electronic apparatus that includes an imaging unit installed on at least one of a vehicle body, another vehicle, or the road. Hereinafter, this electronic apparatus will be referred to as an external device.

Similar to the second embodiment, the reflected light emitted from the infrared light emitting diode (not shown) and reflected by the driver's eyeball is imaged by the visual-line detecting unit 41 via the dichroic mirror 42 and the imaging lens, and the visual line is detected. In general, since it is unlikely that the driver is gazing at one object during driving, a plurality of objects (target objects) where the driver is gazing may be detected. For example, if there are two vehicles parked in parallel on the road and the driver is looking at the two vehicles alternately, the two vehicles are collectively detected as target objects. Then, among the target objects, the blind area that is the blind spot from the driver is calculated (S305), and the coordinates and image information of the blind area are transmitted to the external device. Then, an image including the blind area received from the external device is displayed on the display unit 29 (S401 to S405).

For example, when turning right, the driver checks the right rear before turning, but due to obstacles on the road such as parking on the road, it may not be possible to see a two-wheeled vehicle approaching from the rear from the driver's position. In such a case, when the wearable terminal 100a of this embodiment detects that the driver is paying attention to the obstacle, it receives an image of an area of the obstacle that is a blind spot from the driver from the external device and displays the image on the display unit 29. Then, since the driver can confirm the two-wheeled vehicle that existed at a position (blind spot) that cannot be seen from the driver's seat, the possibility of a entanglement accident can be reduced. If there is no imaging unit that can image the blind area, the display may be waited until the blind area is imaged and nothing may be displayed during that time, or a warning indicating that the blind area cannot be displayed may be displayed.

As described above, the external device including the imaging unit and the communication unit may be installed in the vehicle body, in another vehicle, or on the road. Even when it is installed in the vehicle body, if the imaging unit is provided at a position away from the driver's seat, there is a situation in which it is possible to image an area that is a blind spot from the driver's seat. However, the imaging unit provided in the vehicle driven by the driver cannot image the blind area (when a plurality of imaging units are installed, there is no imaging unit capable of imaging the blind area), or there may be situations where only part of the blind area can be imaged. Therefore, information imaged by the imaging unit of another vehicle, such as a following vehicle, may be received. Further, the image corresponding to the blind area from the driver's seat may be imaged by the external devices installed on the road, and the image of the blind area may be received from the external devices. For example, if a network camera is installed at a signal, a sign, or the like, it is possible to acquire an image corresponding to the blind area of the driver by using an image imaged from a position away from the driver's seat.

Sixth Embodiment

In the first to fifth embodiments, the descriptions have been given of the embodiments where the present invention is applied to the wearable terminal 100. The present invention is applicable to other than the wearable terminal.

In this embodiment, a description will be given of an example in which the driving support system of the fifth embodiment is realized not by the combination of the wearable terminal and the external device but only by the vehicle body or by the combination of the vehicle body and the external device.

Figure 19:
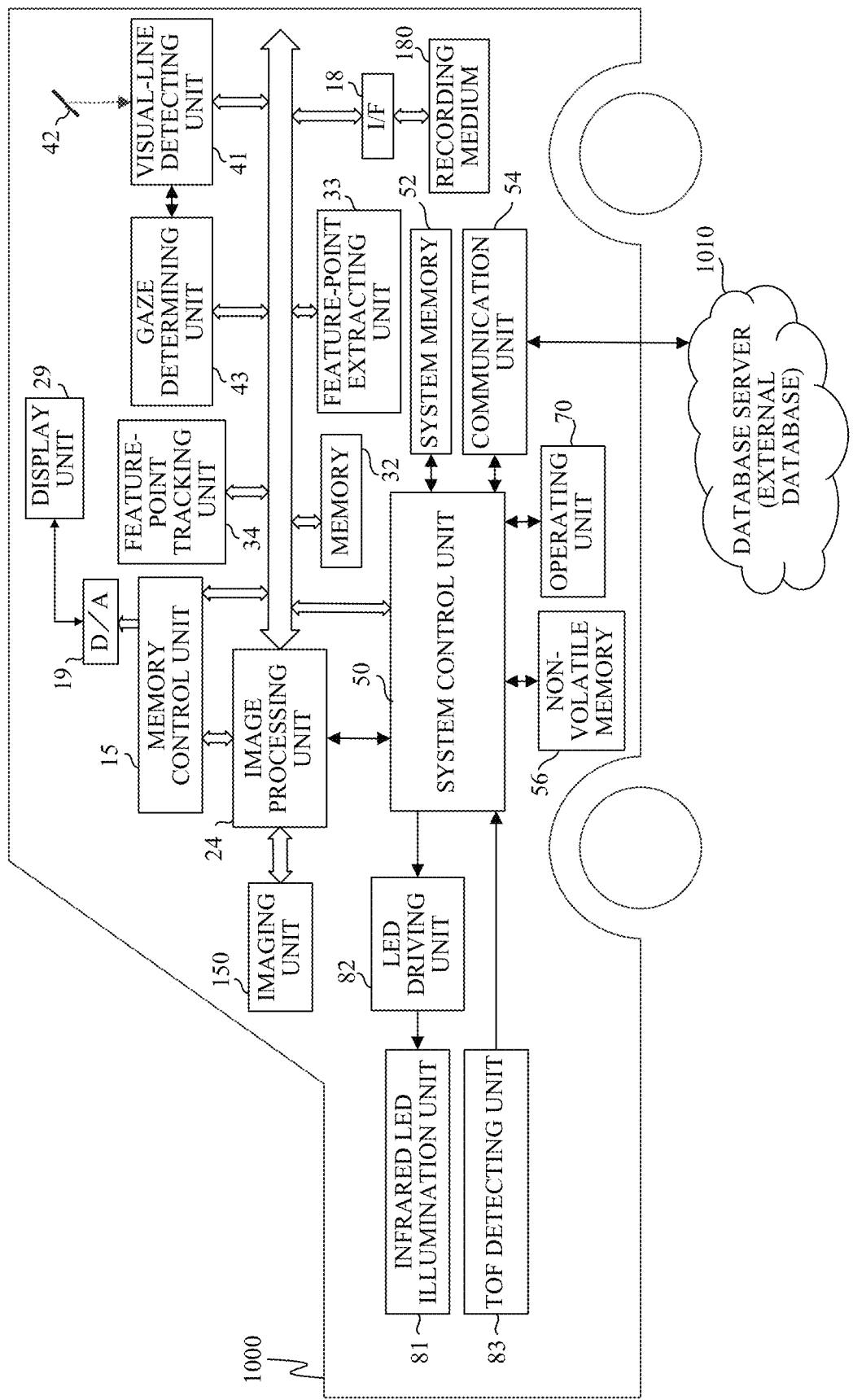
FIG. 19 is a block diagram of a vehicle according to a fifth embodiment.

FIG. 19 is a block diagram of a vehicle 1000 according to the present embodiment, which is related to imaging and display control. Since it is the same as the configuration illustrated in FIG. 2, a detailed description is omitted, but it is different from FIG. 2 in that each of the imaging unit 150 and the display unit 29 is not divided into one for the left eye and one for the right eye. Further, it is different in that the visual-line detecting unit 41 detects the visual line of the user who is driving, instead of the eyes of the user who is gazing at the display unit. In the case of imaging the blind area without linking with the external device, it is preferred that the imaging unit 150 is disposed to image objects not only in the front of the vehicle but also in all directions such as left front, right front, left side, right side, left rear, and right rear, and a plurality of imaging units (for left front, right front, etc.) may be provided. Further, it is preferred that the imaging unit is arranged so that the field of view from the driver's seat can be confirmed. For example, if the imaging unit is arranged so that an imaging range is 360 degrees around the vehicle, objects that the driver is paying attention to can be identified by detecting the visual line of the driver, and further, the blind spot of the objects from the driver (behind the target object as seen by the driver) can be calculated.

The display unit 29 is preferably provided at a position that is easily seen by the driver. For example, it may be placed on a dashboard, left and right of a windshield (near pillars, etc.), near side mirrors, near room mirrors, etc. When it is placed on the dashboard, it may be placed in an instrument panel or a monitor for a navigation system may be used as the display unit 29. In this embodiment, the temperature measurement unit, the scratch/dirt detecting unit, the three-dimensional shape matching unit, the three-dimensional shape restoring unit, the orientation detecting unit, the wear detecting unit, and the power switch are not provided.

Similar to the fifth embodiment, the reflected light emitted from the infrared light emitting diode (not shown) and reflected by the driver's eyeball is imaged by the visual-line detecting unit 41 via the dichroic mirror 42 and the imaging lens, and the visual line is detected. Then, the blind spot of the target objects from the driver is calculated (S305), and the image including the blind area imaged by the imaging unit 150 based on the coordinates and the image information of the blind area is displayed on the display unit 29 (S401 to S405).

In this embodiment, since the display unit 29 is provided in the vehicle body, the driver may not be able to confirm the display unit 29 while gazing at the target object. Therefore, a time lag is set between the time when the visual line is deviated from the target object and the time when the display of the image including the blind area of the target object is stopped, such that the driver can confirm the image of the blind area with the display unit 29. The length of the time lag may be changed depending on positions of the visual line of the driver and the display unit 29. For example, if both the display unit 29 and the target object are in the driver's field of view at the same time, this time lag may be set shorter than when only one is included. Also, the time lag may be set longer when both the display unit 29 and the target object cannot be seen without turning the head (for example, if the display unit 29 is installed on the dashboard and the driver looks back to check the rear) than when both the display unit 29 and the target object can be seen only with eye movement.

Seventh Embodiment

In the first embodiment, the captured image taken by the wearable terminal 100 is displayed on the right-eye display unit 160R and the left-eye display unit 160L, and at least one of pieces of multiple detection information regarding the target object based on the detection result of the visual line of the user is displayed. However, the image displayed on the right-eye display unit 160R and the left-eye display unit 160L of the wearable terminal 100 may be image data created in advance. As a modification of the first embodiment, in this embodiment, an example in which graphic data stored in a game software is used as the data created in advance will be described. The information of the game software is temporarily stored in the memory of the wearable terminal 100 regardless of whether it is stored in the disk, in the cloud or the like.

The wearable terminal 100 in this embodiment also has the same configuration as that in the first embodiment. However, the wearable terminal 100 in this embodiment does not need to include various units for imaging such as the imaging unit 150R for the right eye, the imaging unit 150L for the left eye, the infrared LED illumination unit 81, and the TOF detecting unit 83.

Similar to the first embodiment, the target object that the user is gazing at (the object at the gaze point) is identified in the images displayed in the right-eye display unit 160R and the left-eye display unit 160L (S201, 202), and the information of the target object is acquired (S203, 204). Then, the past information is used as a reference value, and the information having a large change is displayed as compared with the current information (S205). Here, the information of the target object is, for example, in the case of a battle game, various information indicating statuses (information indicating remaining physical strength (HP), information indicating attack power such as technique/magic (MP), defense power, or special ability). By presenting to the user the status of the enemy that the user is gazing at, it is possible to prevent the situation where the necessary information is difficult to understand due to the information overload. In addition, by focusing on the information of the enemies that the user is gazing at, it is difficult for information overload to occur even if there are a plurality of enemies in the displayed image, and by adjusting the gazing time until the information is displayed, the difficulty of the game can be adjusted.

The information of the target object is not limited to the status of the enemy. For example, if the game is a battle game in which a plurality of players cooperate and the user is gazing at an ally, information on the ally's status with a large change may be displayed.

Further, the data created in advance is not limited to the graphic data of the game. For example, by displaying a high-definition image captured by another image pickup apparatus, that is, image pickup apparatus configured separately from the electronic apparatus, on a head-mounted display, it is possible to experience a feeling close to the actual experience, and this modification can be applied to such a case as well. For example, it can be applied to sports images. For example, it is possible to identify a player the user is gazing at and display information that has recently changed among a plurality of pieces of information about the player. If the user is watching a soccer video or a basketball video, the number of points, the number of shots, the number of assists, the penalty information, etc. as a plurality of pieces of information. Even if the sports video is a relay video, the video is temporarily stored in the memory of the wearable terminal.

Eighth Embodiment

In the second embodiment, the description has been given of the example where the captured image taken by the first wearable terminal is displayed on the right-eye display unit 160R and the left-eye display unit 160L, and information on the blind spot that is invisible by the user of the first wearable terminal in the target object of the user of the first wearable terminal is received from the second wearable terminal and is displayed. However, the image displayed in the second embodiment may also be data created in advance. However, in order to display the information of the blind spot, the data needs to be three-dimensional data. In this embodiment, as a modification of the second embodiment, an example in which the graphic data stored in the game software is used as the data created in advance will be described.

Similar to the second embodiment, the first wearable terminal 100a identifies the target object that the user is gazing at in the images displayed on the right-eye display unit 160R and the left-eye display unit 160L (S301, 302). Then, the first wearable terminal 100a calculates the blind area of the user with respect to the target object (S305), and transmits the coordinates and the image information of the blind area to the other terminal (100b). The second wearable terminal 100b transmits an image including the blind area to the first wearable terminal 100a based on the coordinates of the received blind area (S401 to S405). In the case of the battle game, if the facial expression (viewing direction) or movement of the enemy, which is invisible to the user of the first wearable terminal, is visible to the user as an ally player of the second wearable terminal, it is shared with the user of the first wearable terminal. If the target object is a large object such as a building where the enemy can be hidden, and the user of the second wearable terminal sees the enemy behind the building, the information can be shared with the user of the first wearable terminal. The data created in advance is not limited to the graphic data of the game, but may be a sports video or a video of a tourist spot or the like. It is possible to share with another person images that are visible to the user but not to the other person (the "blind spot image" for the other person) in a virtual space that reproduces the tourist spot.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an electronic apparatus and a control method of the same, each of which can preset proper detection information according to a state of a target object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While each embodiment has described a wearable terminal as an electronic apparatus, each embodiment is also applicable to an electronic apparatus other than the wearable terminal. Each embodiment may be applied, for example, to an image pickup apparatus such as a digital camera, a portable digital microscope, a display apparatus such as an image viewer, and an autonomous mobile terminal such as a drone or a mobile robot. Each embodiment may be applied to a personal computer, a PDA, a mobile phone terminal, a game machine, an electronic book reader, or the like. Each electronic apparatus can display proper sensing information according to the state of the work target, and improve the work efficiency. The above embodiments may be combined.

What is claimed is:

1. An electronic apparatus comprising:
a display unit;
a detection unit configured to detect user's visual-line positions;
at least one processor; and
at least one memory coupled to the at least one processor storing instructions that, when executed by the at least one processor, cause the at least one processor to function as:
a determining unit configured to determine a target object that a user is paying attention to based on the result of the detection;
a calculating unit configured to calculate a blind area for a user on the target object;
an acquiring unit configured to acquire a plurality of types of information on the target object;
a referring unit configured to refer to reference information associated with the target object; and
a control unit configured to determine the at least one of the plurality of types of information based on the reference information and the plurality of types of information,
wherein the display unit displays the at least one of the plurality of types of information and image data stored in a memory including the calculated blind area of the image data, and
wherein the reference information is past information of each of the plurality of types of information.

2. The electronic apparatus according to claim 1,
wherein the at least one processor further functions as a calculating unit configured to calculate a coordinate of a detected position in a fixed coordinate system with respect to the target object, and
wherein the control unit stores the plurality of types of information in association with identification information on the target object and the coordinate of the detected position.

3. The electronic apparatus according to claim 1,
wherein the at least one processor further functions as a time measuring unit configured to measure acquired time of the plurality of types of information, and
wherein the control unit stores the plurality of types of information in association with identification information on the target object and the acquired time.

4. The electronic apparatus according to claim 1,
wherein the image data are graphic data of a game, and
wherein the plurality of types of information includes information indicating a plurality of statuses of the game.

5. The electronic apparatus according to claim 1, wherein the image data are captured by an image pickup apparatus configured separately from the electronic apparatus.

6. The electronic apparatus according to claim 1,
wherein the image data are sports image data, and
wherein the plurality of types of information are a plurality of pieces of information related to an athlete.

7. The electronics according to claim 1, further comprising a communication unit, wherein the image data are acquired via the communication unit and stored in the memory.

8. The electronic apparatus according to claim 1, wherein the control unit determines the at least one of the plurality of types of information displayed on the display unit, based on a difference information between the reference information and the plurality of types of information.

9. An electronic apparatus comprising:
a display unit;
a detection unit configured to detect user's visual-line positions;
at least one processor; and
at least one memory coupled to the at least one processor storing instructions that, when executed by the at least one processor, cause the at least one processor to function as:
a determining unit configured to determine a target object that a user is paying attention to based on the result of the detection;
a calculating unit configured to calculate a blind area for a user on the target object; and
an image acquiring unit configured to acquire image data,
wherein the display unit displays an image including the calculated blind area of the image data acquired by the image acquiring unit.

10. The electronic apparatus according to claim 9, wherein the calculating unit calculates the blind area based on a positional relationship between the target object and the electronic apparatus.

11. The electronic apparatus according to claim 9, wherein the blind area is an area on a back side of the target object viewed from the user.

12. The electronic apparatus according to claim 9,
wherein the at least one processor further functions as a control unit configured to determine an area corresponding to the blind area of the image data based on a positional relationship between the electronic apparatus and an imaging unit that captures the image data, and
wherein the display unit displays an image corresponding to the blind area determined by the control unit.

13. A control method of an electronic apparatus, the control method comprising the steps of:
detecting user's visual-line positions;
determining a target object that a user is paying attention to based on the result of the detection;
calculating a blind area for a user on the target object;
acquiring a plurality of types of information on the target object;
referring to reference information associated with the target object;
determining the at least one of the plurality of types of information based on the reference information and the plurality of types of information; and
displaying the at least one of the plurality of types of information and image data stored in a memory including the calculated blind area of the image data,
wherein the reference information is past information of each of the plurality of types of information.

14. A control method of an electronic apparatus, the control method comprising the steps of:
detecting user's visual-line positions;
determining a target object that a user is paying attention to based on the result of the detection;
calculating a blind area for a user on the target object; and
acquiring image data; and
displaying an image including the calculated blind area of the acquired image data.

\* \* \* \* \*